(12) United States Patent
Kim et al.

(10) Patent No.: US 8,610,842 B2
(45) Date of Patent: Dec. 17, 2013

(54) DISPLAY APPARATUS

(75) Inventors: Dong Yong Kim, Gangwon-do (KR); Nam Do Son, Gyeongsangbuk-do (KR); Song Ryol You, Gyeonggi-do (KR); Kyeong Tak Baek, Suseong-gu Daegu (KR); Seong Rok Kim, Seoul (KR); Ki Nam Jean, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 347 days.

(21) Appl. No.: 12/981,761

(22) Filed: Dec. 30, 2010

(65) Prior Publication Data

US 2011/0261283 A1  Oct. 27, 2011

(30) Foreign Application Priority Data

Apr. 27, 2010 (KR) .................. 10-2010-0039023
Apr. 27, 2010 (KR) .................. 10-2010-0039026

(51) Int. Cl.
*G02F 1/1333* (2006.01)
*H04N 5/222* (2006.01)

(52) U.S. Cl.
USPC ........................ 349/58; 348/333.08

(58) Field of Classification Search
USPC .................................. 348/333.08
See application file for complete search history.

(56) References Cited

U.S. PATENT DOCUMENTS

| | | |
|---|---|---|
| 2005/0200737 A1 | 9/2005 | Shinohara et al. |
| 2008/0143922 A1 | 6/2008 | Hayashimoto |
| 2008/0151138 A1* | 6/2008 | Tanaka .................... 349/58 |
| 2009/0244434 A1 | 10/2009 | Chang |
| 2009/0315814 A1 | 12/2009 | Tomida et al. |
| 2010/0315570 A1* | 12/2010 | Mathew et al. ........... 349/58 |

FOREIGN PATENT DOCUMENTS

| | | |
|---|---|---|
| CN | 1591119 A | 3/2005 |
| CN | 101221310 A | 7/2008 |
| TW | 2008-37438 A | 9/2008 |
| TW | 200941075 A | 10/2009 |
| TW | 2010-14441 A | 4/2010 |
| TW | M379101 A | 4/2010 |
| WO | 2009/123696 A2 | 10/2009 |

OTHER PUBLICATIONS

Office Action issued in related Chinese Patent Application No. 201010615133.1 dated Jul. 24, 2013.
TIPO: Office Action for Taiwanese Patent Application No. 099144632—Issued on Sep. 2, 2013.

* cited by examiner

*Primary Examiner* — Michelle R Connelly
(74) *Attorney, Agent, or Firm* — Morgan, Lewis & Bockius LLP

(57) ABSTRACT

A display apparatus, which is able to minimize a thickness by innovatively removing a case and some portions of a set cover and to realize a good aesthetic exterior appearance of the display apparatus by a novel design, includes a set cover exposed to the external to have a storage space, a guide frame received in the storage space, a display unit including a display panel prepared by bonding lower and upper substrates to each other, the display unit placed onto the guide frame, and a camera overlapping with one edge of the display unit and received in the guide frame.

23 Claims, 17 Drawing Sheets

DISPLAY APPARATUS

This application claims the benefit of the Korean Patent Application Nos. 10-2010-0039023 and 10-2010-0039026 filed on Apr. 27, 2010, which are hereby incorporated by reference as if fully set forth herein.

BACKGROUND OF THE INVENTION

1. Field of the Invention

The present invention relates to a display apparatus, and more particularly, to a display apparatus that is capable of minimizing a thickness by innovatively removing a case and some portions of a set cover, which have been regarded as indispensable structures for a camera-embedded display apparatus, and simultaneously is capable of realizing a good aesthetic exterior appearance of the display apparatus by a novel design.

2. Background for the Related Art

Recently, various flat-type display apparatuses have been actively developed and researched to reduce heavy weight and large volume caused by the disadvantages of a Cathode Ray Tube (CRT). The flat-type display apparatuses include, but are not limited to, Liquid Crystal Display (LCD) devices, Plasma Display Panel (PDP), Field Emission Display (FED) devices, Light Emitting Display (LED) devices, etc. Among these devices, the LCD device has attracted great attention because of its advantages such as mass production technology, simple driving means, and high picture quality. Moreover, there is an increasing demand for the research and development of design on flat-type display apparatuses. This research insures steady efforts toward minimization in the thickness of a display apparatus (for example, slimness), and simultaneously makes the increasing requirement for the satisfactory design that is capable to arouse a customer's interest.

The conventional design for slimness and good aesthetic exterior appearance of the display apparatus has been developed by changing structures of the components included in the display apparatus under a circumstance in which all the components are used for the display apparatus. Thus, there has been a limitation to the slimness of the display apparatus and the development of new designs. For instance, a related art LCD device usually uses lower and upper cases to accommodate a liquid crystal display unit and a backlight unit. Further, front and rear set covers are additionally used in the related art LCD device for a notebook computer, a monitor, a mobile device, or a television. As the lower and upper cases and the front and rear set covers are inevitably used in the display apparatus, the upper edges of the liquid crystal display panel are covered with the upper case and the front set cover. Such a structure arrangement increases the thickness of the liquid crystal display apparatus, and also increases the edge width of the liquid crystal display apparatus so that step coverage of the edge is increased, which brings about obstructions and limitations to the development of innovative design.

Also, a camera-embedded notebook computer has been manufactured for the use of video chat or video conference.

SUMMARY OF THE INVENTION

Accordingly, the present invention is directed to a display apparatus that substantially obviates one or more problems due to limitations and disadvantages of the related art.

An object of the present invention is to provide a display apparatus that is able to minimize a thickness by innovatively removing a case and some portions of a set cover, which have been regarded as indispensable structures for the display apparatus, and simultaneously is able to realize a good aesthetic exterior appearance of the display apparatus by a novel design.

Additional advantages and features of the invention will be set forth in part in the description which follows, and in part will become apparent from the description, or may be learned from practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the display apparatus includes a set cover exposed to the external to have a storage space; a guide frame received in the storage space; a display unit including a display panel prepared by bonding lower and upper substrates to each other, the display unit placed onto the guide frame; and a camera overlapped with one edge of the display unit and received in the guide frame.

In addition, the display apparatus further comprises an adhesive member for placing the display panel onto the guide frame.

Also, the camera is received in the guide frame corresponding to a light-incidence portion prepared above one edge of the display unit, and thus the camera takes a series of photographs of the surrounding through the light-incidence portion.

The display unit further comprises a backlight unit for emitting light to the display panel, wherein the backlight unit is placed onto the guide frame and provided to correspond to a lower portion of the display panel.

The display panel comprises a lower substrate placed onto the guide frame; a lower polarizing plate adhered to a rear surface of the lower substrate, the lower polarizing plate facing the backlight unit; the upper substrate bonded to the lower substrate with a liquid crystal layer interposed therebetween; and an upper polarizing plate adhered onto an entire surface of the upper substrate, wherein the upper substrate includes a black matrix which is formed in other edge portions except a predetermined portion overlapped with the light-incidence portion.

The upper polarizing plate includes an exposure hole that overlaps the light-incidence portion.

The display panel comprises a lower substrate including a light-emitting device, the lower substrate overlapped with the camera and placed onto the guide frame; and the upper substrate bonded to the lower substrate, wherein the upper substrate comprises a black matrix that is formed in other edge portions except a predetermined portion overlapped with the light-incidence portion.

The camera is received in the guide frame to be corresponding to the light-incidence portion prepared at one edge of the upper substrate while not overlapping with the lower substrate, and thus the camera takes a series of photographs of the surroundings through the light-incidence portion.

The display unit further comprises a backlight unit for emitting light to the display panel, wherein the backlight unit is placed onto the guide frame and provided to correspond to a lower portion of the display panel.

The display panel comprises a lower substrate placed onto the guide frame while being not overlapped with the camera; a lower polarizing plate adhered to a rear surface of the lower substrate, the lower polarizing plate facing the backlight unit; the upper substrate bonded to the lower substrate with a liquid crystal layer interposed therebetween; and an upper polarizing plate adhered onto an entire surface of the upper substrate, wherein the upper substrate includes a black matrix which is formed in other edge portions except a predetermined portion overlapped with the light-incidence portion.

The upper polarizing plate includes an exposure hole that overlaps the light-incidence portion.

The display panel comprises a lower substrate including a light-emitting device, the lower substrate placed onto the guide frame while not overlapping with the camera; and the upper substrate bonded to the lower substrate, wherein the upper substrate comprises a black matrix which is formed in other edge portions except a predetermined portion overlapped with the light-incidence portion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display apparatus according to the present invention will be described with reference to the accompanying drawings.

Figure 1:
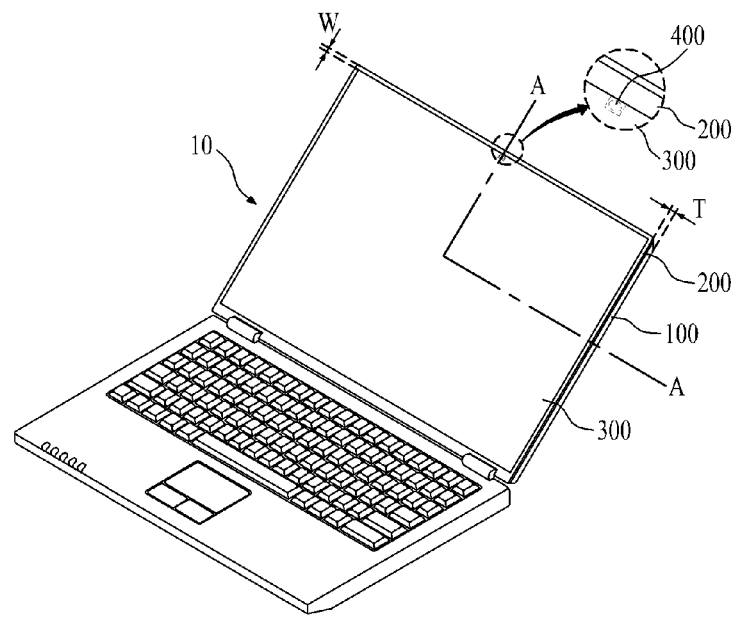
FIG. 1 schematically illustrates a camera-embedded display apparatus used for a notebook computer according to an exemplary embodiment of the present invention.
Figure 2:
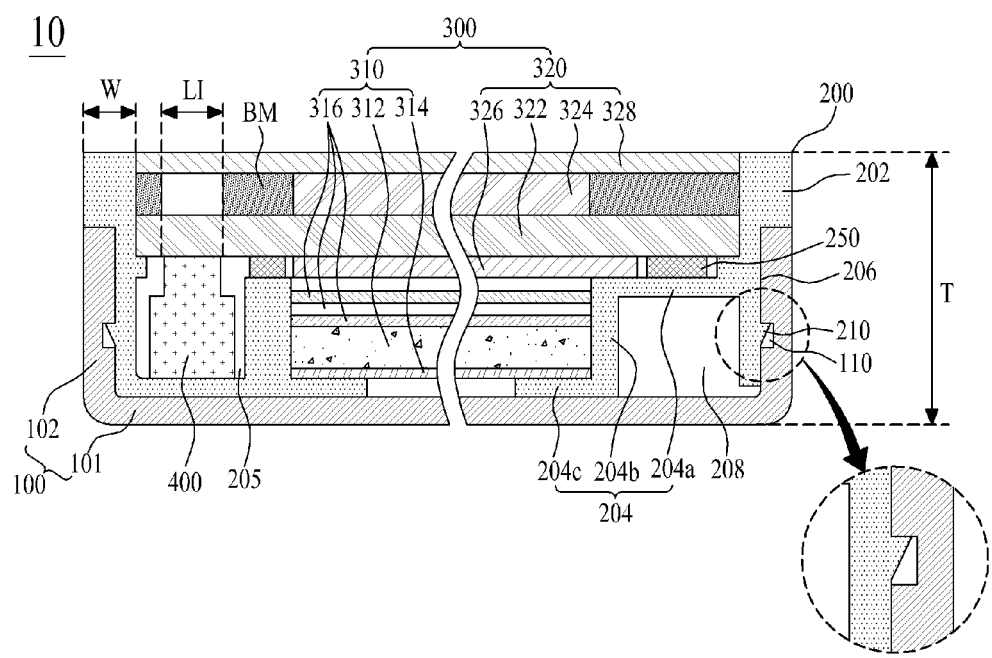
FIG. 2 is a cross section view along A-A of FIG. 1, which illustrates the camera-embedded display apparatus including first and second coupling members according to a first embodiment of the present invention.
Figure 3:
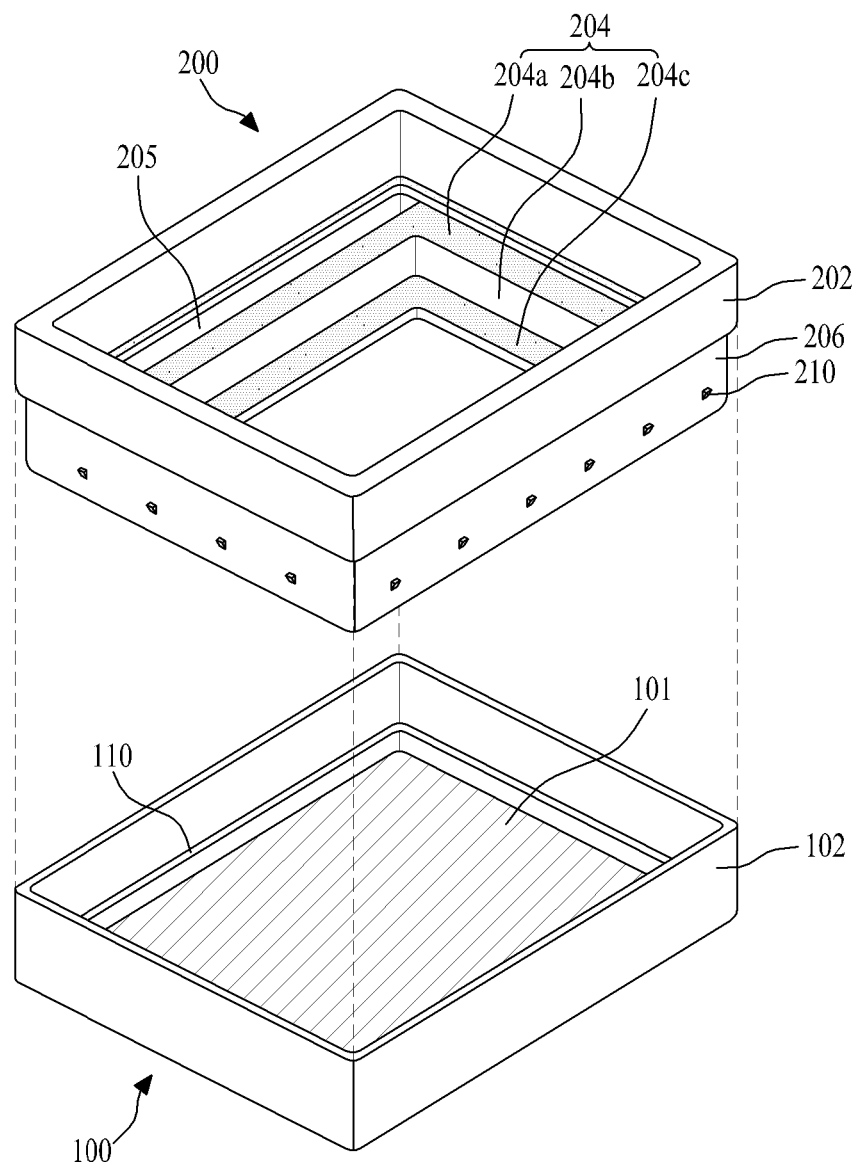
FIG. 3 is a perspective view schematically illustrating a set cover and a guide frame of FIG. 2.

FIG. 1 illustrates a camera-embedded display apparatus used for a notebook computer according to an exemplary embodiment of the present invention. FIG. 2 is a cross section view along A-A of FIG. 1, which illustrates the camera-embedded display apparatus according to a first embodiment of the present invention. FIG. 3 is a perspective view illustrating a set cover and a guide frame of the display apparatus shown in FIG. 2.

Referring to FIGS. 2 and 3, a display apparatus 10 according to the first embodiment of the present invention includes a set cover 100, a guide frame 200, a display unit 300, and a camera 400.

The set cover 100 may be formed in a rectangular-shaped frame. The set cover 100 supports the guide frame 200 and the display unit 300, and simultaneously covers a lateral side of the guide frame 200, whereby the set cover 100 functions as a cover of the manufactured display apparatus 10. In this case, the set cover 100 may be formed of a plastic material or a metal material. For a good aesthetic exterior appearance of the manufactured display apparatus 10, the set cover 100 may be formed of metal material. For this, the set cover 100 may include a set plate 101 and a set sidewall 102.

The set plate 101 may be formed in a flat type to function as a rear cover of the manufactured display apparatus 10. The set sidewall 102 may be vertically curved from the set plate 101, to thereby form a storage space. The set sidewall 102 may be formed to cover a lower surface of the guide frame 200, whereby the set sidewall 102 functions as a lateral cover of the manufactured display apparatus 10.

The guide frame 200, which is received in the storage space of the set cover 100, supports the display unit 300, and receives the camera 400 therein. For this, the guide frame 200 may comprise a guide sidewall 202, a supporter 204, a camera-receiving portion 205, a set sidewall insertion groove 206, and a plurality of first coupling members 210.

The guide sidewall 202 may be vertically formed to cover a lateral side of the display unit 300 while being parallel to the set sidewall 102. At this time, an upper surface of the guide sidewall 202 is exposed to the external so as to cover the lateral side of the display unit 300, but the upper surface of the guide sidewall 202 does not overlap with an upper edge of the display unit 300, whereby the upper surface of the guide sidewall 202 forms an edge of the display unit 300.

The supporter 204 protrudes from the guide sidewall 202 while being opposite to the set sidewall 102, to thereby support the display unit 300. For this, the supporter 204 may comprise a first part 204a, a curved part 204b, and a second part 204c. While being parallel to the set plate 101, the first part 204a protrudes from other portions of the guide sidewall 202 except a predetermined portion to be adjacent to the camera-receiving portion 205. The curved part 204b may be vertically curved from one end of the first part 204a toward the set plate 101. The second part 204c may be curved from one end of the curved part 204b while being parallel to the set plate 101 and being placed onto the set plate 101.

The camera-receiving portion 205 may be formed in a space between the first part 204a of the supporter 204 and the guide sidewall 202 covering one lateral side of the display unit 300 (for example, an upper portion of the display unit 300). In this case, the camera 400, a driving circuit (not shown) for driving and controlling the camera 400, a notebook system controller (not shown), or a signal line for connecting the driving circuit and a controller (not shown) of the display unit 300 may be received in the camera-receiving portion 205.

The set sidewall insertion groove 206 may be hollowly formed in a lower outer surface of the guide sidewall 202 except an upper outer surface of the guide sidewall 202. The set sidewall insertion groove 206 may be covered by the set sidewall 102 inserted thereinto.

A plurality of first coupling members 210 may be formed in the set sidewall insertion groove 206, and then connected to the set sidewall 102. For this, the plurality of first coupling members 210 protrude from the outer surface of the set sidewall insertion groove 206, and each include a stepped surface, and a slant surface that is inclined by a predetermined angle.

In the inner surface of the set sidewall 102, a plurality of second coupling members 110 may be formed to be coupled to the plurality of first coupling members 210, respectively. Each of the plural second coupling members 110 may be formed in a groove shape to be coupled to the slant surface of each of the plural first coupling members 210, to thereby prevent a separation of the guide frame 200. Each of the plural first coupling members 210 may be inserted into and coupled to each of the plural second coupling members 110, whereby the set cover 100 and the guide frame 200 are connected to each other.

Meanwhile, the guide frame 200 may further include an empty room 208 between the curved part 204b of the supporter 204 and the guide sidewall 202. An antenna or antenna wire used for the notebook computer may be arranged in the empty room 208.

Figure 4:
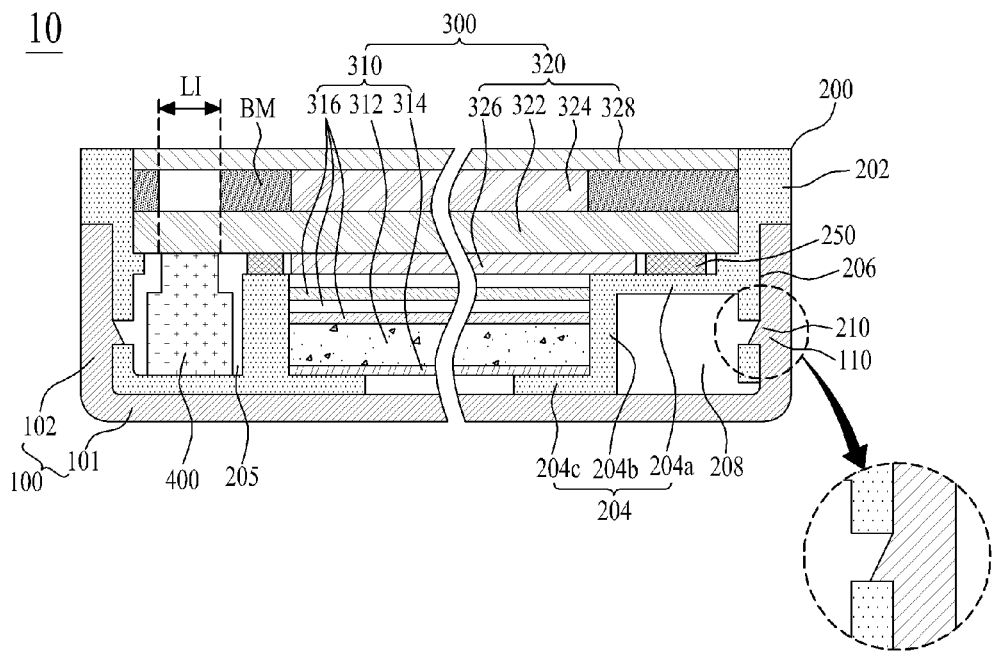
FIG. 4 is a cross section view of the camera-embedded display apparatus including another embodiment of first and second coupling members of FIG. 2.

For the above explanation, the plurality of first coupling members 210 are formed in the protrusion type along the guide sidewall 202, and the plurality of second coupling members 110 are formed in the groove type along the set sidewall 102. The first and second coupling members 210 and 110 are not limited to the above-described structure arrangement, and may be formed in various shapes appropriate for their coupling. For example, as shown in FIG. 4, the plurality of first coupling members 210 may be formed in shape of groove or hole along the guide sidewall 202, and the plurality of second coupling members 110 may be formed in shape of protrusion along the set sidewall 102.

A color of the guide frame 200 may be the same as a color displayed for a non-driving mode of the display unit 300. For example, the guide frame 200 may have a black color.

In FIG. 2, the display unit 300 comprises a backlight unit 310 and a liquid crystal display panel 320. The backlight unit 310 may be placed onto the second part 204c of the guide frame 200 to emit light to the rear surface of the liquid crystal display panel 320. At this time, the rear side of the backlight unit 310 is supported by the second part 204c of the guide frame 200, and the lateral side of the backlight unit 310 is covered by the curved part 204b of the guide frame 200. The backlight unit 310 may include a light-guiding plate 312, a reflective sheet 314, and an optical member 316.

The light-guiding plate 312 may be formed in a flat type to have a light-incidence surface, thereby guiding the light, which is emitted from a light source (not shown) and is then incident on the light-incidence surface, toward the liquid crystal display panel 320. At this time, the light source (not shown) may be formed to include a fluorescent lamp or light-emitting diode.

The reflective sheet 314 may be arranged on the rear surface of the light-guiding plate 312, and placed onto the second part 204c of the guide frame 200. The reflective sheet 314 reflects the light from the light-guiding plate 312 toward the liquid crystal display panel 320.

The optical member 316 may be arranged on the light-guiding plate 312 to improve a luminance property of the light advancing toward the liquid crystal display panel 320 from the light-guiding plate 312. For this, the optical member 316 may include at least two sheets of a lower diffusion sheet, a lower prism sheet, an upper prism sheet, and an upper diffusion sheet.

The lower diffusion sheet may be arranged on the light-guiding plate 312 to diffuse the light incident from the light-guiding plate 312 and to apply the diffused light to the lower prism sheet. The lower prism sheet may be arranged on the lower diffusion sheet to concentrate the light incident from the lower diffusion sheet into a first direction and to apply the concentrated light to the upper prism sheet. At this time, the first direction may correspond to a long or short side direction of the light-guiding plate 312. The upper prism sheet may be arranged on the lower prism sheet to concentrate the light incident from the lower prism sheet into a second direction and to apply the concentrated light to the upper diffusion sheet. At this time, the second direction may be perpendicular to the first direction. According to the structure of the backlight unit 310, the upper prism sheet may be omitted. Also, the lower and upper prism sheets may be substituted by one prism sheet including first and second light-concentrating patterns to concentrate the light from the lower diffusion sheet into the first and second directions. Furthermore, the first and second light-concentrating patterns may be formed on the lower diffusion sheet. If the first and second light-concentrating patterns may be formed on the lower diffusion sheet, the lower and upper prism sheets may be omitted.

The upper diffusion sheet may be arranged on the upper prism sheet to diffuse the light incident from the upper prism sheet and to apply the diffused light to the liquid crystal display panel 320. At this time, if the upper prism sheet is omitted, the upper diffusion sheet may be arranged on the lower prism sheet to diffuse the light incident from the lower prism sheet and to apply the diffused light to the liquid crystal display panel 320. Also, if both the lower and upper prism sheets are omitted, the upper diffusion sheet may diffuse the light incident from the lower diffusion sheet with the first and second light-concentrating patterns, and apply the diffused light to the liquid crystal display panel 320.

The liquid crystal display panel 320 is arranged on the backlight unit 310, thereby adjusting transmittance of the light emitted from the backlight unit 310 to display a predetermined image. At this time, the rear side of the liquid crystal display panel 320 may be placed onto the first part 204a of the guide frame 200, and the lateral side of the liquid crystal display panel 320 may be covered by the guide sidewall 202 of the guide frame 200. There may be a support protrusion in the guide sidewall 202 to support the rear side of the liquid crystal display panel 320.

The liquid crystal display panel 320 may be placed onto the first part 204a of the guide frame 200 through the use of adhesive member 250. At this time, the adhesive member 250 may be a double-sided tape, and adhere onto the edge of the rear surface of the liquid crystal display panel 320 or onto the first part 204a of the guide frame 200, whereby stably placing the liquid crystal display panel 320 onto the guide frame 200.

The liquid crystal display panel 320 may include a lower substrate 322, an upper substrate 324, a lower polarizing plate 326, and an upper polarizing plate 328. The lower substrate 322 may include a plurality of pixels (not shown) in every region formed by crossing a plurality of gate lines (not shown) and data lines (not shown). Each pixel may include a thin film transistor (not shown) connected to the gate and data lines, a pixel electrode connected to the thin film transistor, and a common electrode formed adjacent to the pixel electrode, wherein a common voltage is applied to the common electrode. The common electrode may be formed on the upper substrate 324 according to a driving mode of liquid crystal layer. The lower substrate 322 forms an electric field corresponding to a differential voltage between the common voltage and data voltage applied to each pixel, to thereby adjust the light transmittance of liquid crystal layer.

The aforementioned adhesive member 250 adheres onto the edge of the lower substrate 322 or the first part 204a, whereby connecting the lower substrate 322 with the guide frame 200. The lower and upper substrates 322 and 324 are bonded to each other with the liquid crystal layer interposed therebetween. The incident light passing through the liquid crystal layer is filtered through the color filter of the upper substrate 324 so that the predetermined colored light is emitted to the external. Accordingly, the predetermined colored image is displayed on the liquid crystal display panel 320. For this, the upper substrate 324 may include a color filter (not shown) corresponding to each pixel of the lower substrate 322, and a black matrix (BM) formed along the edge of each pixel so as to separate the respective color filters from one another. According to a driving mode of liquid crystal layer, a common electrode supplied with a common voltage may be formed on the upper substrate 324. Moreover, a detailed structure of the lower and upper substrates 322 and 324 may vary according to the driving modes of the liquid crystal display panel 320, which include Twisted Nematic (TN) mode, Vertical Alignment (VA) mode, In-Plane Switching (IPS) mode, Fringe Field Switching (FFS) mode, etc.

The lower polarizing plate 326 may be formed on the rear surface of the lower substrate 322 to polarize the light incident from the backlight unit 310 and to apply the polarized light to the lower substrate 322. The lower polarizing plate 326 is attached onto the rear surface of the lower substrate 322 without overlapping with the camera 400.

The aforementioned display unit 300 may be a light-emitting display unit that includes a light-emitting display panel with an organic light-emitting device, instead of being the liquid crystal display unit that includes the backlight unit 310 and the liquid crystal display panel 320. In this case, in the guide frame 200, the guide sidewall 202 may be used for covering the lateral side of the light-emitting display unit 300; the first part 204a may be used for supporting the rear surface of the light-emitting display unit 300; the set sidewall insertion groove 206 in the guide sidewall 202 may have the set sidewall 102 of the set cover 100 inserted thereinto; and the plurality of first coupling members 210 may be formed in the set sidewall insertion groove 206 and coupled to the plurality of second coupling members 110.

The camera 400 is received in the camera-receiving portion 205 prepared in the guide frame 200 corresponding to one edge of the display unit 300. The camera 400 takes a series of photographs of the surroundings through a light-incidence portion (L1) prepared at one edge of the display unit 300. In this case, the upper polarizing plate 328, the upper substrate 324, and the lower substrate 322 overlap with one another in the light-incidence portion (L1) that corresponds to a path of ambient light incident on the camera 400. In order to make the ambient light incident on the camera 400 through the light-incidence portion (L1), the black matrix (BL) may be formed in other edge portions except for a predetermined portion overlapping with the light-incidence portion (L1).

In the display apparatus 10 according to the first embodiment of the present invention, the camera 400 may be received in the guide frame 200 with overlapping with one edge of the display unit 300. Thus, even though the camera 400 is embedded in the display apparatus, the edge width of the display unit 300 can be reduced. Also, the display unit 300 may be supported by the guide frame 200, and the guide frame 200 and set cover 100 may be connected to each other. Thus, a total thickness (T) (shown in FIG. 2) of the display apparatus can be decreased by innovatively removing related art lower and upper cases and front cover of product.

In the display apparatus 10 according to the first embodiment of the present invention, the upper surface of the guide sidewall 202 may be exposed to the external so as to cover the lateral surface of the display unit 300, whereby the upper surface of the guide sidewall 202 forms the frontal edge of the display unit 300. Thus, there is no requirement for an additional structure for covering the upper edge of the display unit 300 and the lateral side of the guide frame 200, thereby decreasing the total thickness (T) of the display apparatus 10.

As described above, the camera-embedded display apparatus according to the first embodiment of the present invention is decreased in its thickness (T), and is also minimized in its edge width (W), so that the display apparatus 10 can be achieved with the novel design and the improved aesthetic exterior appearance.

Figure 5:
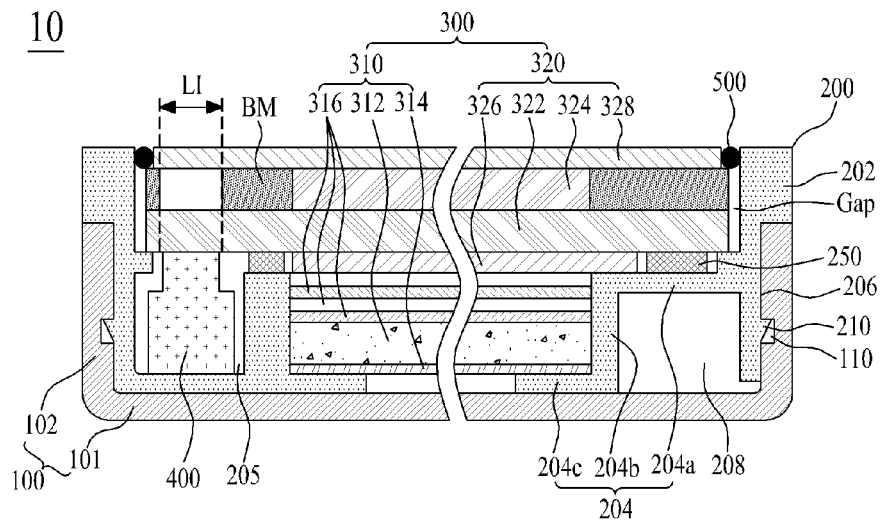
FIG. 5 is a cross section view schematically illustrating the display apparatus including a sealing member in a first exemplary structure according to a second embodiment of the present invention.

FIG. 5 is a cross section view schematically illustrating a display apparatus according to a second embodiment of the present invention.

Referring to FIG. 5, the display apparatus 10 according to the second embodiment includes a set cover 100, a guide frame 200, a display unit 300, a camera 400, and a sealing member 500. Except that a sealing member 500 is additionally provided, the display apparatus 10 according to the second embodiment is identical in structure to the display apparatus according to the first embodiment shown in FIGS. 2 to 4, whereby a detailed explanation for the same parts will be omitted.

During a process of manufacturing the display unit 300, and more particularly, liquid crystal display panel 320 and guide frame 200, a gap may occur between a lateral side of the liquid crystal display panel 320 and a guide sidewall 202 of the guide frame 200 due to a manufacturing error. Thus, the sealing member 500 may be used to seal the gap between the lateral side of the liquid crystal display panel 320 and the guide frame 200 so that the sealing member 500 forms a front edge of the display unit 300, to thereby prevent foreign matters such as dust from coming into the inside of the display apparatus 10 through the gap. At this time, a color of the sealing member 500 may be the same as a color of the guide frame 200, which enables to realize the good aesthetic exterior appearance of the display apparatus 10 by preventing a color difference between the sealing member 500 and the guide frame 200.

For this, the sealing member 500 may be formed in a ring shape. The ring-shaped sealing member 500 is inserted into the gap between the lateral side of the liquid crystal display panel 320 and the guide frame 200, to thereby seal the gap. Thus, the foreign matters such as dust can be prevented from coming into the inside of the display apparatus 10 through the gap.

Figure 6:
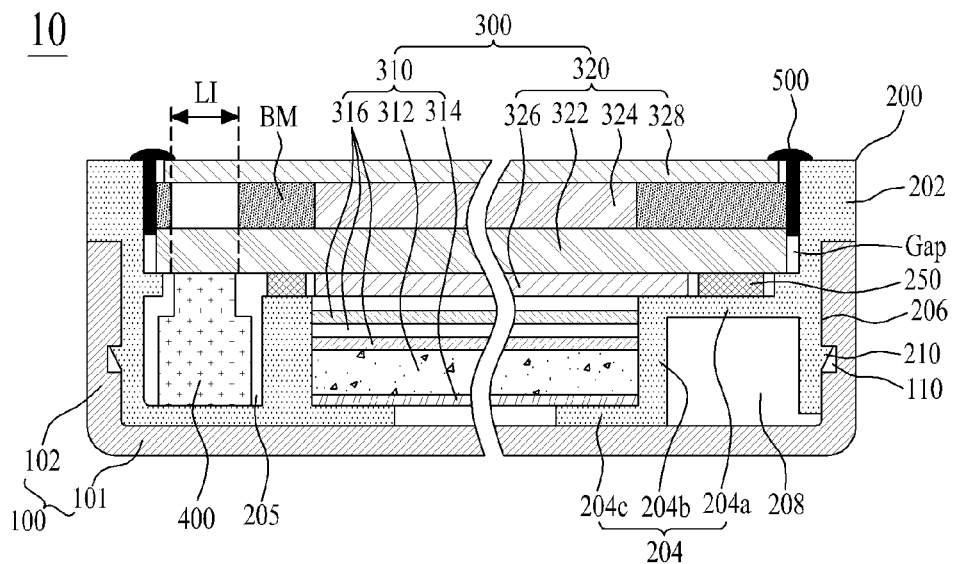
FIG. 6 illustrates the display apparatus including the sealing member in a second exemplary structure.

As shown in FIG. 6, the sealing member 500 may be formed in a pin shape including a semicircular head, and a head supporter for supporting the semicircular head. In this exemplary structure, the head supporter is inserted into the gap, and the semicircular head overlaps with the edge of the liquid crystal display panel 320 and the upper surface of the guide sidewall 202 so as to cover the gap. Thus, the sealing member 500 seals the gap between the lateral side of the liquid crystal display panel 320 and the guide frame 200, to thereby prevent the foreign matters such as dust from coming into the inside of the display apparatus 10 through the gap.

Figure 7:
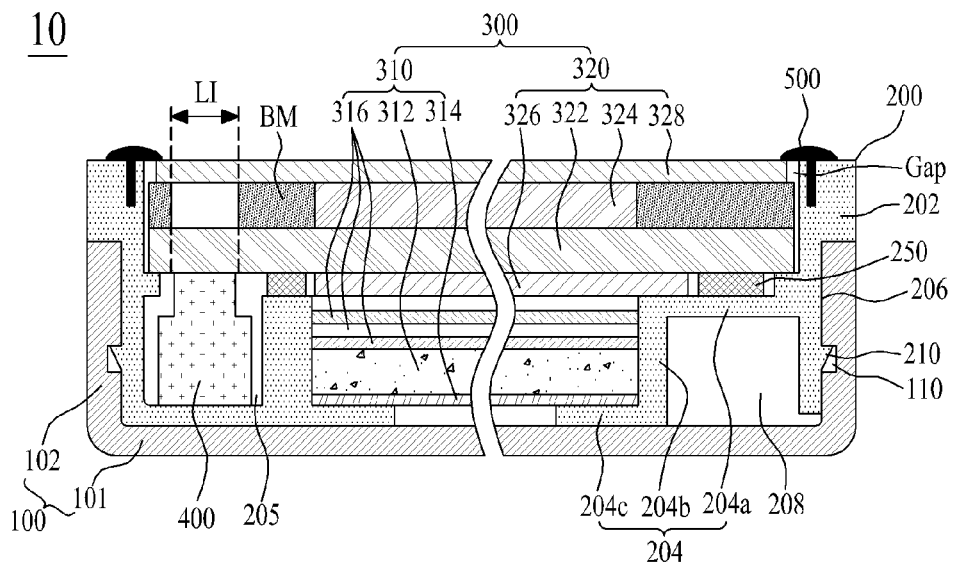
FIG. 7 illustrates the display apparatus including the sealing member in a third exemplary structure.

As shown in FIG. 7, the sealing member 500 may also include a semicircular head that covers the gap between the lateral side of the liquid crystal display panel 320 and the guide sidewall 202 of the guide frame 200, and a head supporter that is formed integrally with the upper inner portion of the guide sidewall 202 so as to support the head. In this exemplary structure, the sealing member 500 may be formed simultaneously with the guide frame 200. That is, the sealing member 500 and the guide frame 200 may be formed by a double injection molding method. Accordingly, the sealing member 500 seals the gap between the lateral side of the liquid crystal display panel 320 and the guide sidewall 202, to thereby prevent the foreign matters such as dust from coming into the inside of the display apparatus 10 through the gap.

Figure 8:
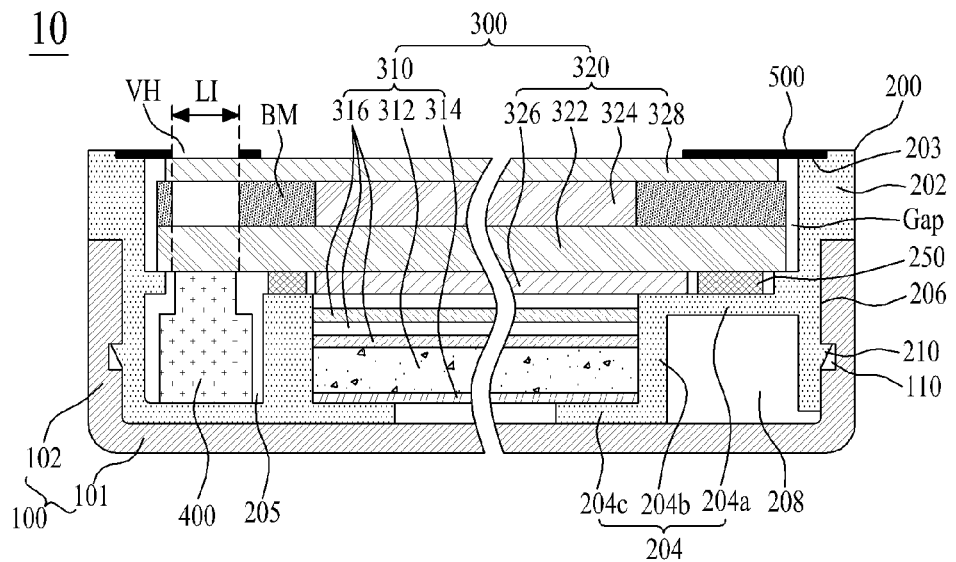
FIG. 8 illustrates the display apparatus including the sealing member in a fourth exemplary structure.

As shown in FIG. 8, the sealing member 500 may be formed in a film type that adheres to the upper edge of the liquid crystal display panel 320 and simultaneously to the partial portion of the upper surface of the guide frame 200, to thereby seal the gap between the lateral side of the liquid crystal display panel 320 and the guide sidewall 202 of the guide frame 200. In this exemplary structure, the film-type sealing member 500 may have, but not limited to, 0.2t thickness. The thickness of the sealing member 500 may be determined within a range to minimize step coverage with the liquid crystal display panel 320, which enables the good aesthetic exterior appearance of the display apparatus 10.

If the film-type sealing member 500 adheres to the entire upper surface of the guide sidewall 202, the sealing member 500 may be peeled off due to a user's contact. In this respect, the sealing member 500 adheres to the partial portion of the upper surface of the guide sidewall 202. Specifically, a sealing member adhesion groove 203 may be formed in the upper surface of the guide sidewall 202, and the sealing member 500 adheres to the sealing member adhesion groove 203. The film-type sealing member 500 adheres to the liquid crystal display panel 320 between the upper edge of upper polarizing plate and the sealing member adhesion groove 203 of the guide frame 200, to thereby seal the gap between the lateral side of the liquid crystal display panel 320 and the guide sidewall 202. Thus, the foreign matters such as dust can be prevented from coming into the inside of the display apparatus 10 through the gap.

In order to make the ambient light incident on the camera 400 through a light-incidence portion (L1), the film-type sealing member 500 adhering to overlap with a camera-receiving portion 205 may further include a via hole (VH) that is formed to overlap with the light-incidence portion (L1).

In the display apparatus 10 according to the second embodiment, the gap can be sealed between the lateral side of the liquid crystal display panel 320 and the guide sidewall 202 through the sealing member 500, to thereby prevent the foreign matters such as dust from coming into the inside of the display apparatus 10 through the gap. This provides the same effects as those of the first embodiment of the present invention.

Figure 9:
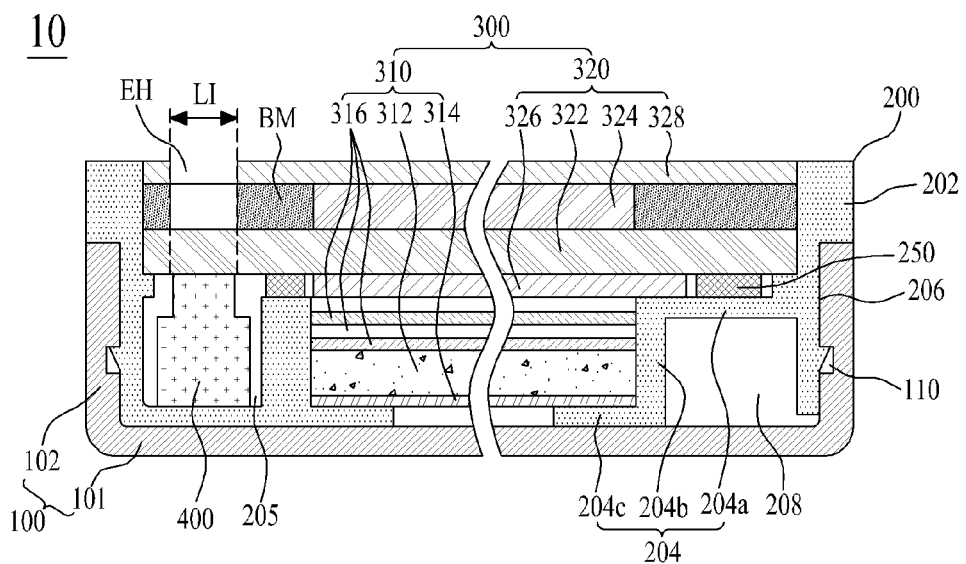
FIG. 9 schematically illustrates the display apparatus according to a third embodiment of the present invention.

FIG. 9 is a cross section view schematically illustrating a display apparatus according to a third embodiment of the present invention.

Referring to FIG. 9, the display apparatus 10 according to the third embodiment includes a set cover 100, a guide frame 200, a display unit 300, a camera 400, and an exposure hole (EH). Except for the exposure hole (EH) that is additionally provided, the display apparatus 10 according to the third embodiment is identical in structure to the display apparatus according to the first embodiment shown in FIGS. 2 to 4, whereby a detailed explanation for the same parts will be omitted.

The exposure hole (EH) may be formed in a predetermined portion of an upper polarizing plate 328 corresponding to a light-incidence portion (L1) overlapping with a camera-receiving portion 205. Thus, the camera 400 takes a series of photographs of the surroundings through the use of ambient light incident on the light-incidence portion (L1) through the exposure hole (EH) in the upper polarizing plate 328.

The display apparatus 10 according to the third embodiment may further include a sealing member (not shown) along a front edge of the display unit 300 so as to seal a gap (not shown) between a lateral side of a liquid crystal display panel 320 and a guide frame 200. The sealing member may be formed in any one among the sealing members 500 shown in FIGS. 5 to 8, whereby a detailed explanation for the sealing member will be substituted by the aforementioned descriptions of FIGS. 5 to 8.

The display apparatus 10 according to the third embodiment includes the exposure hole (EH) that is formed in the upper polarizing plate 328 while overlapping with the light-incidence portion (L1) corresponding to the camera 400, to improve picture quality of the photographs taken by the camera 400. This provides the same effects as those of the first and second embodiments of the present invention.

Figure 10:
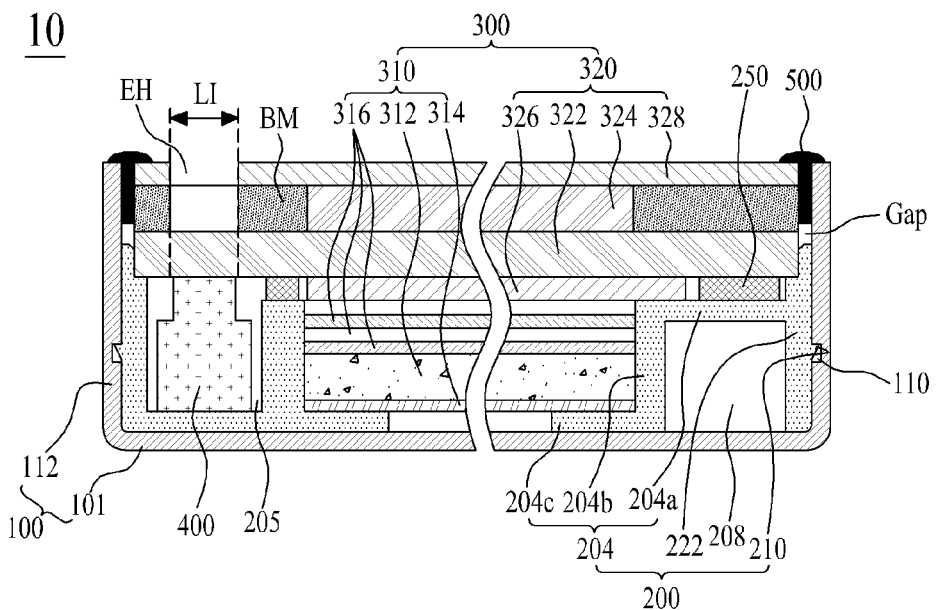
FIG. 10 schematically illustrates a display apparatus according to a fourth embodiment of the present invention.

FIG. 10 is a cross section view schematically illustrating a display apparatus according to the fourth embodiment of the present invention.

Referring to FIG. 10, the display apparatus 10 according to the fourth embodiment includes a set cover 100, a guide frame 200, a display unit 300, and a camera 400. Except for structures in a set sidewall 122 of the set cover 100 and a guide sidewall 222 of the guide frame 200, the display apparatus 10 according to the fourth embodiment is identical in structure to the display device according to the third embodiment shown in FIG. 9, whereby a detailed explanation for the same parts will be omitted.

The set cover 100 may be formed in a rectangular-shaped frame to include a set plate 101 and set sidewall 112. The set cover 100 supports the guide frame 200 and display unit 300, and simultaneously covers a lateral side of the display unit 300 to function as a cover for covering lateral and rear sides of the manufactured display apparatus.

The set plate 101 may be formed in a flat type to function as a rear cover of the manufactured display device. The set sidewall 112 may be vertically curved from the set plate 101 to form a storage space. In this case, an upper end of the set sidewall 112 covers a lateral side of the display unit 300. Simultaneously, the upper end of the set sidewall 112 is exposed to the external without overlapping with an upper edge of the display unit 300, to thereby form an edge of the display unit 300.

The guide frame 200 is received in the storage space of the set cover 100 to support the display unit 300 and receive the camera 400 therein. For this, the guide frame 200 includes a guide sidewall 222, a supporter 204, a camera-receiving portion 205, and a plurality of first coupling members 210. Except for the guide sidewall 222 of the guide frame 200, the guide frame 200 is formed in a structure of any one among the aforementioned first to third embodiments, whereby a detailed explanation for the guide frame 200 will be omitted.

The guide sidewall 222 may be vertically formed to cover a lower surface of the liquid crystal display panel 320 while being parallel to the set sidewall 112, to thereby guide the liquid crystal display panel 320 in its placing. In a lower outer surface of the guide sidewall 222, a plurality of first coupling members 210 may be connected to the set sidewall 112. Also, stepped surfaces are formed in an upper portion of the guide sidewall 222 protruding from the supporter 204, whereby the liquid crystal display panel 320 is placed onto the supporter 204 by the stepped surfaces.

In an inner surface of the set sidewall 112, a plurality of second coupling members 110 may be formed to be coupled to the plurality of first coupling members 210, respectively. Each of the second coupling members 110 may be formed in a groove shape to be coupled to the stepped surface of each of the first coupling members 210, to thereby prevent a separation of the guide frame 200. The set cover 100 and the guide frame 200 are connected to each other.

The display apparatus 10 according to the fourth embodiment may further include a sealing member 500 along a front edge of the display unit 300 to seal a gap between the lateral side of the liquid crystal display panel 320 and the set sidewall 112. The sealing member 500 may be formed in a pin shape including a head for covering the gap, and a head supporter inserted into the gap to support the head. Instead of the pin shape, the sealing member 500 may be formed in a ring shape or film shape as shown in FIG. 5 or 8. In the display apparatus 10 according to the fourth embodiment, the set cover 100 covers the lateral and rear sides of the display apparatus, and also forms the front edge of the display unit 300, to thereby minimize the edge width, and to provide the same effects as those of the aforementioned embodiment.

Figure 11:
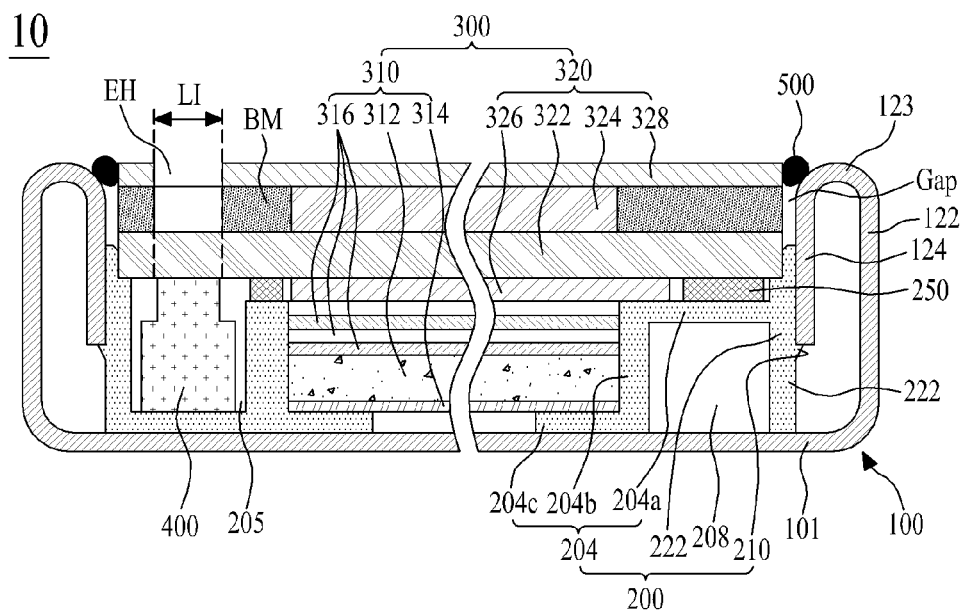
FIG. 11 schematically illustrates a display apparatus according to a fifth embodiment of the present invention.

FIG. 11 is a cross section view schematically illustrating a display apparatus according to a fifth embodiment of the present invention.

Referring to FIG. 11, the display apparatus 10 according to the fifth embodiment includes a set cover 100, a guide frame 200, a display unit 300, and a camera 400. Except for the set cover 100, the display apparatus 10 according to the fifth embodiment is identical in structure to the display apparatus according to the fourth embodiment shown in FIG. 10, whereby a detailed explanation for the same parts will be omitted.

The set cover 100 supports the guide frame 200 and covers a lateral side of the display unit 300, to thereby function as a cover for covering lateral and rear sides of the manufactured display apparatus. For this, the set cover 100 includes a set plate 101, a set sidewall 122, a bending part 123, and an inner sidewall 124.

The set plate 101 supports the guide frame 200 onto which the display unit 300 is placed. The set sidewall 122 may be vertically bent from the set plate 101, to thereby provide a storage space for receiving the guide frame 200 therein. The bending part 123 with a predetermined curvature may be bent from one end of the set sidewall 122 toward the display unit 300. The bending part 123 covering the lateral side of the display unit 300 is exposed to the external without overlapping with an upper edge of the display unit 300, to thereby form an edge of the display unit 300. The inner sidewall 124 may be vertically extended from one end of the bending part 123, being parallel to the set sidewall 122, and connected to a first coupling member 210 in a guide sidewall 222 of the guide frame 200.

The display apparatus 10 according to the fifth embodiment may further include a sealing member 500 along a front edge of the display unit 300 to seal a gap between the lateral side of the liquid crystal display panel 320 and the bending part 123. The sealing member 500 may be formed in a pin shape including a head for covering the gap, and a head supporter inserted into the gap to support the head. Instead of the pin shape, the sealing member 500 may be formed in a ring shape or film shape shown in FIG. 5 or 8.

In the display apparatus 10 according to the fifth embodiment, the bending part 123 of the set cover 100 and the guide frame 200 are connected to each other, and the bending part 123 forms the front edge of the display unit 300 to realize the good aesthetic exterior appearance through the use of bending part 123 and to provide the same effects as those of the aforementioned embodiments.

Figure 12:
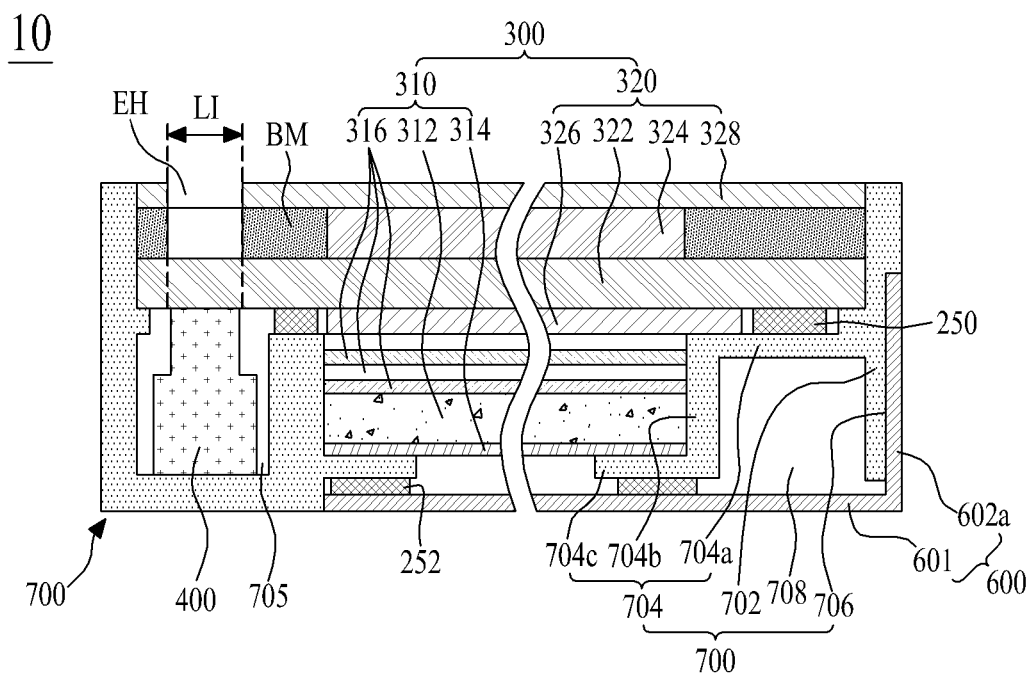
FIG. 12 schematically illustrates a display apparatus according to a sixth embodiment of the present invention.
Figure 13:
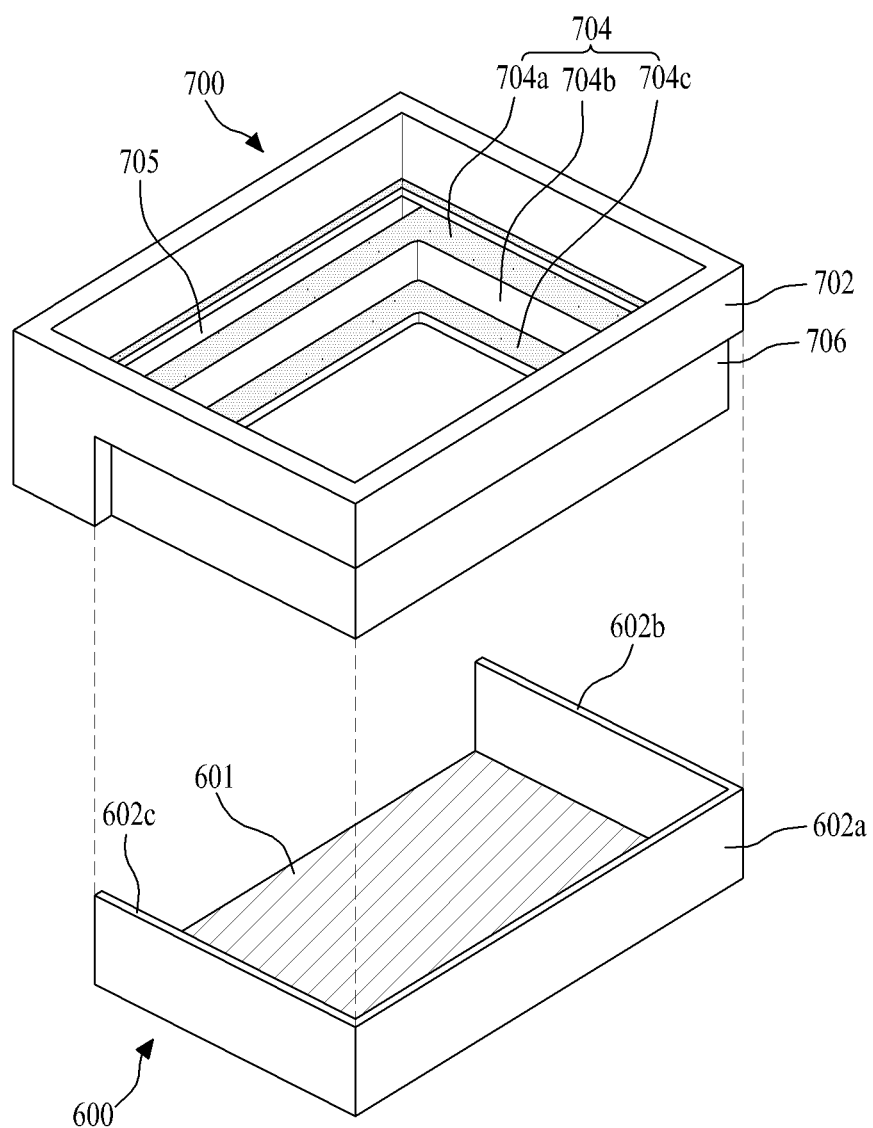
FIG. 13 is a perspective view schematically illustrating a set cover and a guide frame shown in FIG. 12.

FIG. 12 is a cross section view schematically illustrating a display apparatus according to a sixth embodiment of the present invention. FIG. 13 is a perspective view schematically illustrating a set cover and a guide frame shown in FIG. 12.

Referring to FIGS. 12 and 13, the display apparatus 10 according to the sixth embodiment includes a set cover 600, a guide frame 700, a display unit 300, and a camera 400. Except for the set cover 600 and the guide frame 700, the display apparatus 10 according to the sixth embodiment is identical in structure to the display apparatus according to the third embodiment shown in FIG. 9, whereby a detailed explanation for the same parts will be omitted.

The set cover 600 supports the guide frame 700 and simultaneously covers a lateral side of the guide frame 700, to thereby function as a cover of the manufactured display apparatus. For this, the set cover 600 includes a set plate 601, and first to third set sidewalls 602a, 602b, and 602c.

The set plate 601 supports the guide frame 700 onto which the display unit 300 is placed. The first set sidewall 602a may be vertically curved from a lower surface of the set plate 601 to cover partial portions of a lower surface of the guide frame 700. The second set sidewall 602b may be vertically curved from a left-sided surface of the set plate 601 to cover a left-sided surface of the guide frame 700. The third set sidewall 602c may be vertically curved from a right-sided surface of the set plate 601 to cover a right-sided surface of the guide frame 700. The first to third set sidewalls 602a, 602b, and 602c form a storage space for receiving the guide frame 700 therein.

The guide frame 700 is received in the storage space prepared by the set cover 600. Thus, the display unit 300 is supported by the guide frame 700, and the camera 400 is received in the guide frame 700. For this, the guide frame 700 comprises a guide sidewall 702, a supporter 704, a camera-receiving portion 705, and a set sidewall insertion groove 706.

The guide sidewall 702 may be vertically formed to cover a lateral side of the display unit 300. At this time, an upper surface of the guide sidewall 702 covering the lateral side of the display unit 300 is exposed to the external without overlapping with an upper edge of the display unit 300, to thereby form an edge of the display unit 300. The supporter 704 protrudes from the guide sidewall 702, to thereby support the display unit 300. For this, the supporter 704 includes a first part 704a, a curved part 704b, and a second part 704c.

While being parallel to the set plate 601, the first part 704a protrudes from other portions of the guide sidewall 702 except for a predetermined portion to be adjacent to the camera-receiving portion 705. At this time, the first part 704a protrudes with a predetermined width from the guide sidewall 702 corresponding to the first to third set sidewalls 602a, 602b, and 602c, and simultaneously protrudes to connect the guide sidewalls 702 corresponding to the second and third set sidewalls 602b and 602c to each other.

The curved part 704b may be vertically curved from one end of the first part 704a toward the set plate 601. The second part 704c may be curved from one end of the curved part 704b while being parallel to the set plate 601 and being placed onto the set plate 601. The camera-receiving portion 705 may be formed in a space between the first part 704a of the supporter 704 and the guide sidewalls 702 covering one lateral side of the display unit 300 (for example, an upper portion of the display unit). That is, the camera-receiving portion 705 may be hollowly formed in the first part 704a and the guide sidewall 702 that is not covered by the set cover 600. Thus, each lateral side and a rear side of one edge of the guide frame 700 with the camera-receiving portion 705 may be exposed to the external without being covered by the set cover 600. Meanwhile, the camera 400, a driving circuit (not shown) for driving and controlling the camera 400, a notebook system controller (not shown), or a signal line for connecting the driving circuit and a controller (not shown) of the display unit may be received in the camera-receiving portion 705.

The set sidewall insertion groove 706 may be hollowly formed in the lower outer surface of the guide sidewall 702 except for the upper outer surface of the guide sidewall 702 corresponding to the first to third set sidewalls 602a, 602b, and 602c. The set sidewall insertion groove 706 is covered by the first to third set sidewalls 602a, 602b, and 602c.

The guide frame 700 may further include an empty room 708 between the guide sidewall 702 and the curved part 704b of the supporter 704. An antenna or antenna wire used for a notebook computer may be arranged in the empty room 708. The aforementioned guide frame 700 may be connected to the set plate 601 by an adhesive member 252. At this time, the adhesive member 252 may be a double-sided tape. The adhesive member 252 adheres onto the rear side of the second part 704c formed in the supporter 704 of the guide frame 700, whereby the guide frame 700 is placed onto the set plate 601. Thus, the guide frame 700 may be received in and connected to the set cover 600 by the adhesive member 700 without using an additional coupling member.

The display apparatus 10 according to the sixth embodiment may further include a sealing member (not shown) along a front edge of the display unit 300 to seal a gap (not shown) between the lateral side of the liquid crystal display panel 320 and the guide sidewall 702. The sealing member may be formed in any one of ring shape, pin shape, and film shape shown in FIGS. 5 to 8. In the display apparatus 10 according to the sixth embodiment, the set cover 100 covers the rear side and three lateral sides of the guide frame 700, and the adhesive member 252 connects the guide frame 700 and the set cover 600 to each other, whereby the guide sidewall 702 of the guide frame 700 forms the front edge of the display unit 300. This provides the same effects as those of the aforementioned embodiments of the present invention.

Figure 14:
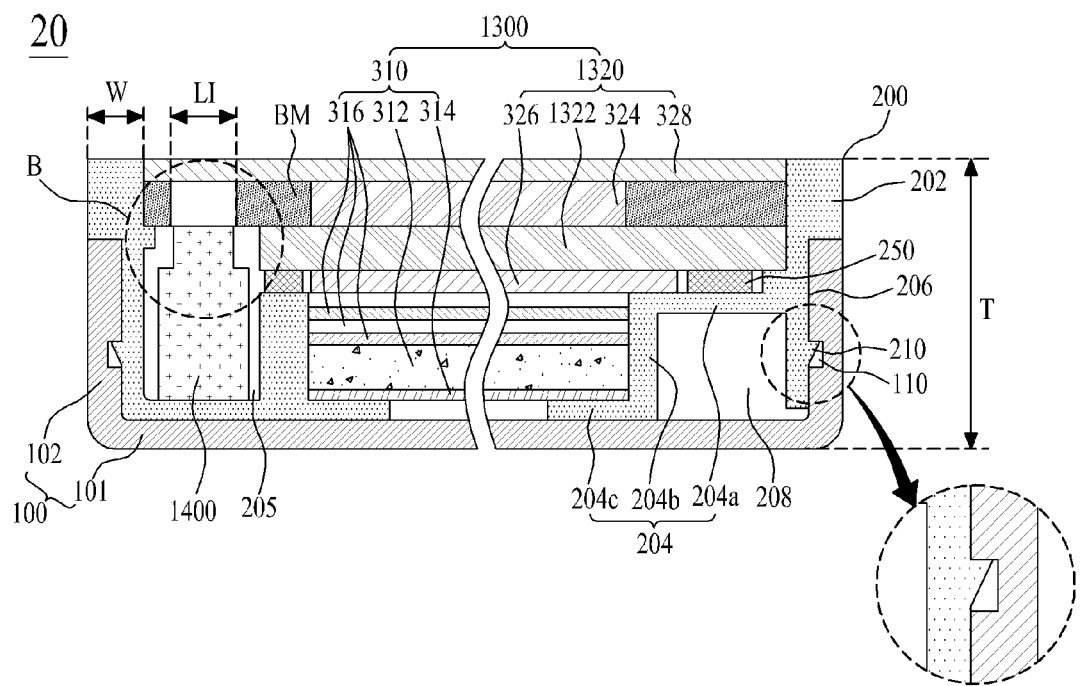
FIG. 14 is a cross section view along A-A of FIG. 1, which illustrates a display apparatus having first and second coupling members according to a seventh embodiment of the present invention.
Figure 15:
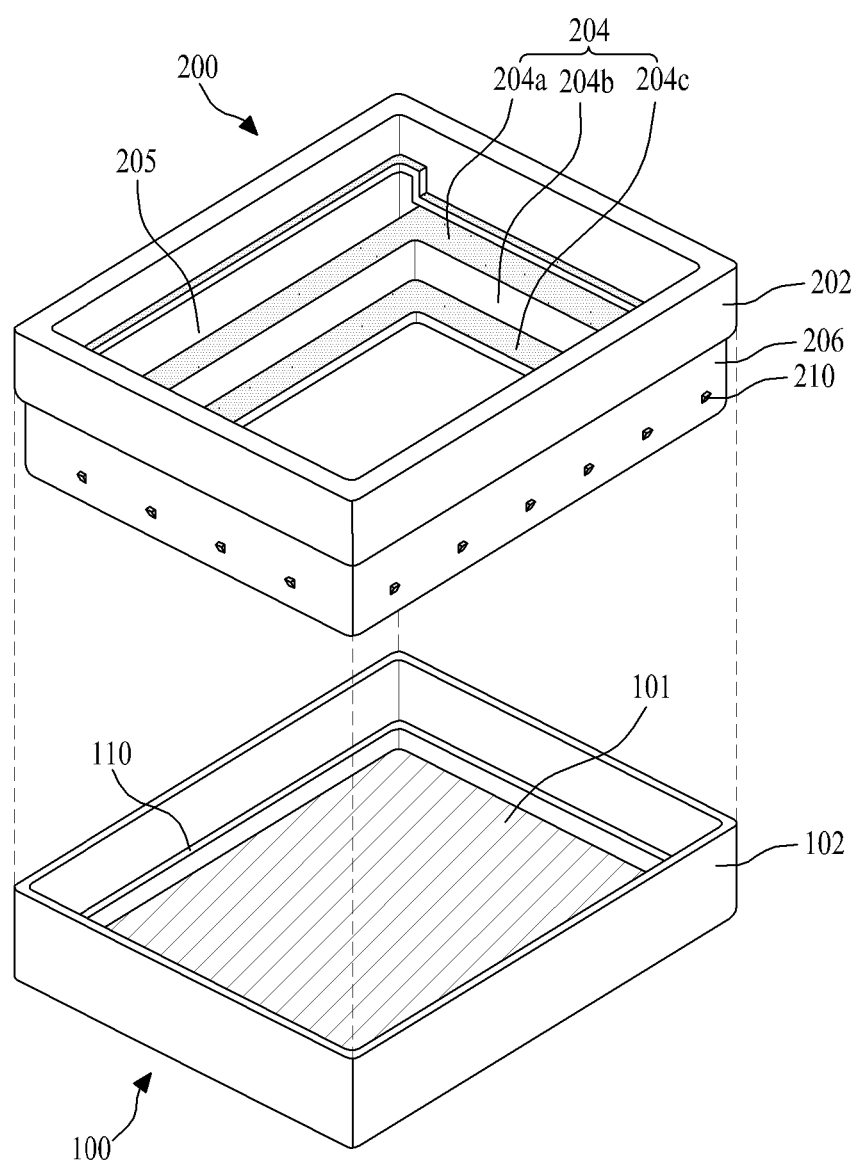
FIG. 15 is a perspective view illustrating a set cover and a guide frame shown in FIG. 14.
Figure 16:
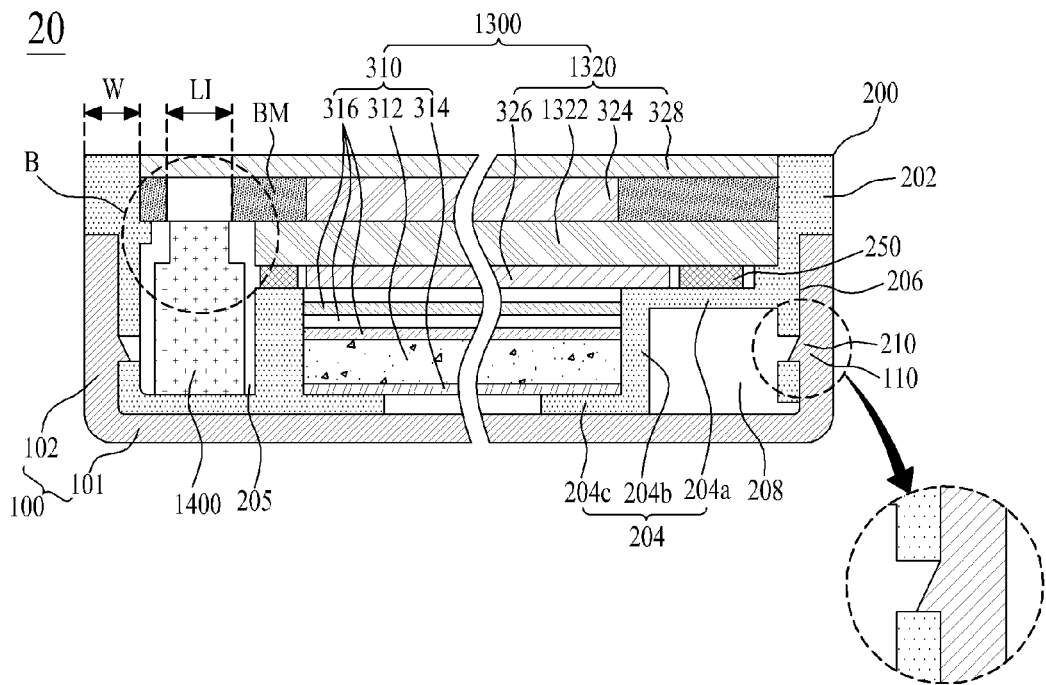
FIG. 16 illustrates another embodiment of first and second coupling members shown in FIG. 14.

FIG. 14 is a cross section view along A-A of FIG. 1, which schematically illustrates a display apparatus according to a seventh embodiment of the present invention. FIG. 15 is a perspective view schematically illustrating a set cover and a guide frame shown in FIG. 14. FIG. 16 illustrates another structure of first and second coupling members shown in FIG. 15.

Referring to FIGS. 14 to 16, the display apparatus 20 according to the seventh embodiment includes a set cover 100, a guide frame 200, a display unit 1300, and a camera 1400. Except for the display unit 1300 and camera 1400, the display apparatus 20 according to the seventh embodiment is identical in structure to the display apparatus according to the first embodiment shown in FIGS. 1 to 4, whereby a detailed explanation for the same parts will be omitted, and the same reference numbers will be used throughout the drawings to refer to the same or like parts.

In FIG. 14 or 16, the display unit 1300 includes a backlight unit 310 and a liquid crystal display panel 1320. The backlight unit 310 is placed onto a second part 204c of a guide frame 200 to emit light to a rear surface of a liquid crystal display panel 320. At this time, a rear side of the backlight unit 310 may be supported by the second part 204c of the guide frame 200, and a lateral side of the backlight unit 310 may be covered by a curved part 204b of the guide frame 200. The backlight unit 310 includes a light-guiding plate 312, a reflective sheet 314, and an optical member 316. This backlight unit 310 is identical in structure to the backlight unit according to the first embodiment, whereby a detailed explanation for the backlight unit 310 will be substituted by the aforementioned description for the first embodiment.

Figure 17:
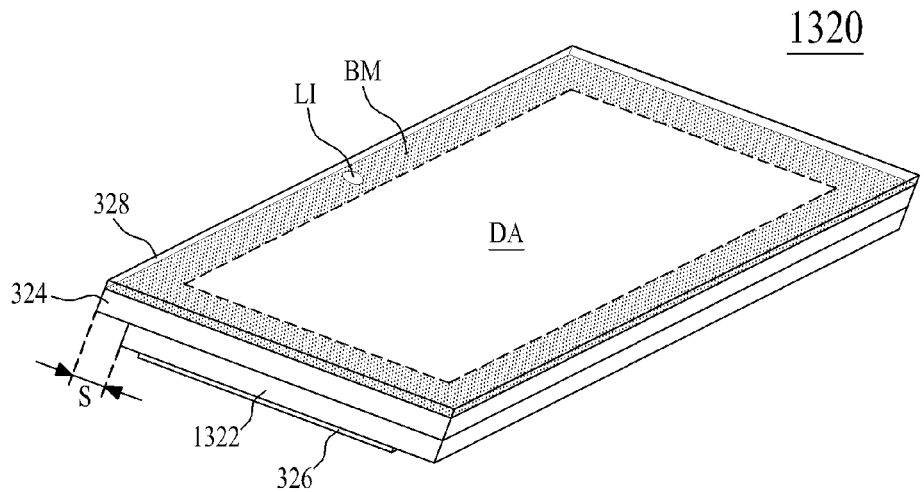
FIG. 17 is a perspective view illustrating the display panel shown in FIG. 14.

The liquid crystal display panel 1320 is received in the guide frame 200 and is then arranged onto the backlight unit 310, to display a predetermined image by adjusting transmittance of light emitted from the backlight unit 310. For this, the liquid crystal display panel 1320 includes a lower substrate 1322, an upper substrate 324, a lower polarizing plate 326, and an upper polarizing plate 328, as shown in FIG. 17.

The lower substrate 1322 includes a plurality of pixels (not shown) in every region formed by crossing a plurality of gate lines (not shown) and data lines (not shown). Each pixel may include a thin film transistor (not shown) connected to the gate and data lines, a pixel electrode connected to the thin film transistor, and a common electrode formed adjacent to the pixel electrode, wherein a common voltage is applied to the common electrode. The common electrode may be formed on the upper substrate 324 according to a driving mode of liquid crystal layer. The lower substrate 1322 forms an electric field corresponding to a differential voltage between the common voltage and data voltage applied to each pixel, to thereby adjust the light transmittance of liquid crystal layer.

The lower substrate 1322 may be placed onto the first part 204a of the supporter 204 without overlapping with the camera-receiving portion 205 prepared in the guide frame 200. A rear edge of the lower substrate 1322 may be placed onto the first part 204a, and a lateral side of the lower substrate 1322 may be covered by a guide sidewall 202 of the guide frame 200. Also, the lateral side of the lower substrate 1322 may be placed onto the first part 204a while being adjacent to the camera-receiving portion 205 prepared in the guide frame 200, wherein the lateral side of the lower substrate 1322 faces the camera 1400.

As mentioned above, an adhesive member 250 may adhere onto the edge of the lower substrate 1322 or the first part 204a, to thereby connect the lower substrate 1322 and the guide frame 200 to each other. The lower and upper substrates 1322 and 324 are bonded to each other with the liquid crystal layer interposed therebetween. The incident light passing through the liquid crystal layer is filtered through the color filter of the upper substrate 324 so that the predetermined colored light is emitted to the external. Accordingly, the predetermined colored image is displayed on the liquid crystal display panel 1320. For this, the upper substrate 324 includes a color filter (not shown) corresponding to each pixel of the lower substrate 1322, and a black matrix (BM) formed along the edge of each pixel to define a display area (DA) and simultaneously to separate the respective color filters from one another.

In the meantime, one side of the upper substrate 324, which is adjacent to the camera-receiving portion 205 prepared in the guide frame 200, may be more extended to cover the camera-receiving portion 205. Specifically, one edge of the upper substrate 324 may overlap with the camera 1400 since the lower and upper substrates 1322 and 324 are different in size. The upper substrate 324 may be larger than the lower substrate 1322 by a size (S) of the camera-receiving portion 205. Moreover, a detailed structure of the lower and upper substrates 1322 and 324 may vary according to the driving modes of the liquid crystal display panel 320, which include Twisted Nematic (TN) mode, Vertical Alignment (VA) mode, In-Plane Switching (IPS) mode, Fringe Field Switching (FFS) mode, etc. For example, while the IPS mode applies the common electrode on the lower substrate 1322, the TN mode applies the common electrode on the upper substrate 324.

The lower polarizing plate 326 may be formed on the rear surface of the lower substrate 1322, wherein the lower polarizing plate 326 polarizes the light incident from the backlight unit 310, and applies the polarized light to the lower substrate 1322. While not overlapping with the camera 1400, the lower polarizing plate 326 adheres onto the rear surface of the lower substrate 1322. The upper polarizing plate 328 is formed on the entire surface of the upper substrate 324, whereby the light incident through the upper substrate 324 is polarized by the upper polarizing plate 328, and the polarized light is emitted to the external.

The liquid crystal display panel 1320 may be placed onto the first part 204a by the adhesive member 250. The adhesive member 250 may be a double-sided tape. The adhesive member 250 may adhere onto the edge of the rear surface of the liquid crystal display panel 1320 or onto the first part 204a of the guide frame 200, whereby the liquid crystal display panel 1320 is placed onto the guide frame 200. There may be support protrusions in the guide sidewall 202, wherein the support protrusions support the rear edge of the lower substrate 1322, and simultaneously support the rear side of one edge of the upper substrate 324.

The aforementioned display unit 1300 may be formed of a light-emitting display unit including a light-emitting display panel with an organic light-emitting device, instead of the liquid crystal display unit including the backlight unit 310 and the liquid crystal display panel 1320. In this case, the guide frame 200 may include the guide sidewall 202 for covering the lateral side of the light-emitting display unit, and the first part 204a for supporting the rear surface of the light-emitting display unit. The guide frame 200 also includes the set sidewall insertion groove 206 into which the set sidewall 102 of the set cover 100 is inserted, and the plurality of first coupling members 210 that are formed in the set sidewall insertion groove 206 and are coupled to the plurality of second coupling members 110.

Like "B" of the FIG. 14 or 16, the camera 1400 is received in the camera-receiving portion 205 prepared in the guide frame 200 corresponding to one edge of the upper substrate 324. In this case, an upper side of the camera 1400 faces the lateral side of the lower substrate 1322 without overlapping with the lower substrate 1322. The camera 1400 takes a series of photographs of the surroundings through a light-incidence portion (L1) prepared at one edge of the upper substrate 324. Herein, the upper polarizing plate 328 and the upper substrate 324 overlap in the light-incidence portion (L1) that corresponds to a path of ambient light incident on the camera 1400. In order to make the ambient light incident on the camera 1400 through the light-incidence portion (L1), as shown in FIG. 17, the black matrix (BM) may be formed in other edge portions except for a predetermined portion overlapping with the light-incidence portion (L1), to thereby define the display area (DA) of the display panel 1320.

In the display apparatus 20 according to the seventh embodiment, the camera 1400 is received in the guide frame 200 while overlapping with the upper substrate 324 of the display panel 1320, and one edge of the lower substrate 1322 does not overlap with the camera 1400. Thus, the edge width (W) of camera-embedded display unit can be decreased. Also, the height of the guide frame 200 is decreased by the thickness of the lower substrate 1322, thereby decreasing the total thickness (T) of the display apparatus. In the display apparatus 20 according to the seventh embodiment, the display unit 1300 is supported by the guide frame 200, and the guide frame 200 and set cover 100 are connected to each other, thereby innovatively removing related art lower and upper cases and front cover of product. Thus, there is no additional structure for covering the upper edge of the display unit 1300 and the lateral side of the guide frame 200, thereby decreasing the total thickness (T) of the display apparatus.

As a result, the display apparatus 20 with the camera 1400 embedded therein according to the seventh embodiment is decreased in its thickness (T), and is minimized in its edge width (W), thereby manufacturing the display apparatus having the novel design with the improved aesthetic exterior appearance.

Figure 18:
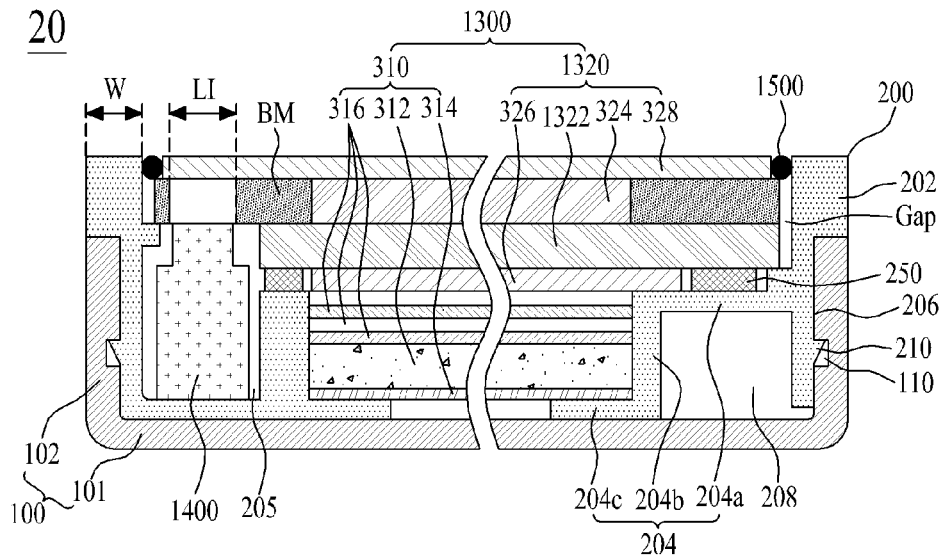
FIG. 18 is a cross section view illustrating a display apparatus having a sealing member in a first exemplary structure according to an eighth embodiment of the present invention.

FIG. 18 is a cross section view schematically illustrating a display apparatus according to an eighth embodiment. Referring to FIG. 18, the display apparatus 20 according to the eighth embodiment includes a set cover 100, a guide frame 200, a display unit 1300, a camera 1400, and a sealing member 1500. Except for the sealing member 1500 that is additionally provided, the display apparatus 20 according to the eighth embodiment is identical in structure to the display apparatus according to the seventh embodiment, whereby a detailed explanation for the same parts will be omitted.

The sealing member 1500 seals a gap between a lateral side of a liquid crystal display panel 1320 and a guide frame 200 to form a front edge of the display unit 1300, thereby preventing the foreign matters such as dust from coming into the inside of the display apparatus 20 through the gap. At this time, a color of the sealing member 1500 may be the same as a color of the guide frame 200, which enables the display apparatus to realize a good aesthetic exterior appearance by preventing a color difference between the sealing member 1500 and the guide frame 200. The sealing member 1500 may be formed in a ring shape. The ring-shaped sealing member 1500 is inserted into the gap between the lateral side of the liquid crystal display panel 1320 and the guide frame 200, to thereby seal the gap. Thus, the foreign matters such as dust can be prevented from coming into the inside of the display apparatus through 20 the gap.

Figure 19:
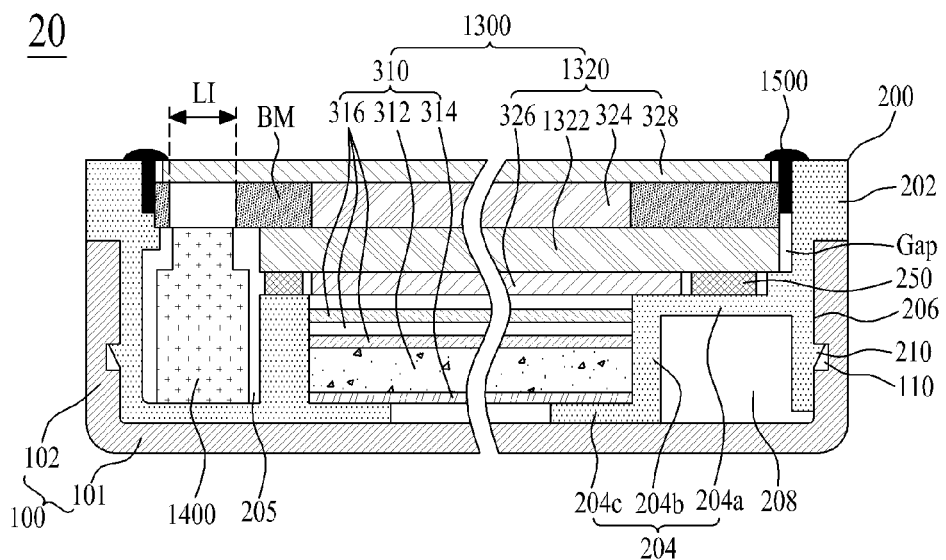
FIG. 19 illustrates the sealing member shown in FIG. 18 in a second exemplary structure.

As shown in FIG. 19, the sealing member 1500 according to the second embodiment may be formed in a pin shape including a semicircular head, and a head supporter for supporting the semicircular head. At this time, the head supporter is inserted into the gap, and the head is overlapped with the edge of the liquid crystal display panel 1320 and an upper surface of a guide sidewall 202 so as to cover the gap. Accordingly, the sealing member 1500 seals the gap between the lateral side of the liquid crystal display panel 1320 and the guide frame 200, thereby preventing the foreign matters such as dust from coming into the inside of the display apparatus 20 through the gap.

Figure 20:
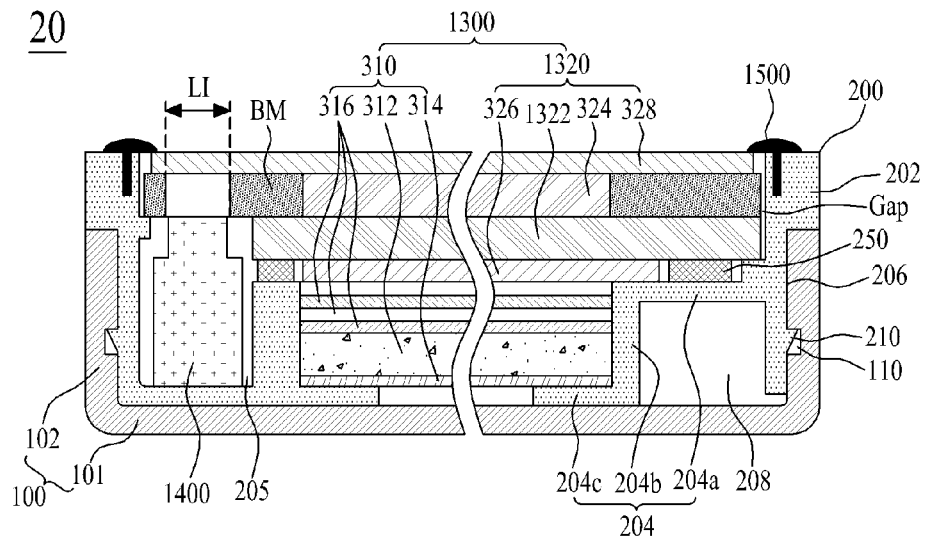
FIG. 20 illustrates the sealing member shown in FIG. 18 in a third exemplary structure.

As shown in FIG. 20, the sealing member 1500 according to the third embodiment includes a semicircular head that covers the gap between the lateral side of the liquid crystal display panel 1320 and the guide sidewall 202 of the guide frame 200, and a head supporter that is formed as one body with the upper inner portion of the guide sidewall 202 so as to support the head. In this case, the sealing member 1500 may be formed simultaneously with the guide frame 200. That is, the sealing member 1500 and the guide frame 200 may be formed by a double injection molding method. Accordingly, the sealing member 1500 seals the gap between the lateral side of the liquid crystal display panel 1320 and the guide sidewall 202, thereby preventing the foreign matters such as dust from coming into the inside of the display apparatus through the gap.

Figure 21:
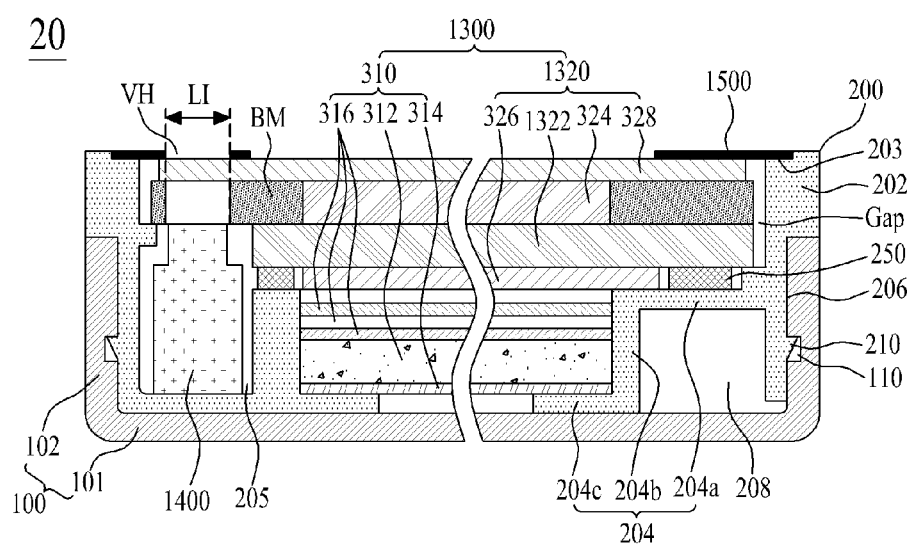
FIG. 21 illustrates the sealing member shown in FIG. 18 in a fourth exemplary structure.

As shown in FIG. 21, the sealing member 1500 according to the fourth embodiment is formed in a film type that adheres to the upper edge of the liquid crystal display panel 1320 and simultaneously to the partial portion of the upper surface of the guide frame 200, to thereby seal the gap between the lateral side of the liquid crystal display panel 1320 and the guide sidewall 202 of the guide frame 200. In this case, the film-type sealing member 1500 may have, but not limited to, 0.2t thickness. The thickness of the sealing member 1500 may be determined within a range to minimize step coverage with the liquid crystal display panel 1320, which enables the good aesthetic exterior appearance of the display apparatus.

If the film-type sealing member 1500 adheres to the entire upper surface of the guide sidewall 202, the sealing member 1500 may be peeled off due to a user's contact. In this respect, the sealing member 1500 adheres to the partial portion of the upper surface of the guide sidewall 202. For this, a sealing member adhesion groove 203 is formed in the upper surface of the guide sidewall 202, and the sealing member 1500 adheres to the sealing member adhesion groove 203. Accordingly, the film-type sealing member 1500 adheres to the liquid crystal display panel 1320, between the upper edge of upper polarizing plate and the sealing member adhesion groove 203 of the guide frame 200, to thereby seal the gap between the lateral side of the liquid crystal display panel 1320 and the guide sidewall 202. Thus, the foreign matters such as dust can be prevented from coming into the inside of the display apparatus through the gap.

In order to make the ambient light incident on the camera 1400 through a light-incidence portion (L1), the film-type sealing member 1500 adhering to overlap with a camera-receiving portion 205 may further include a via hole (VH) that is formed to overlap with the light-incidence portion (L1).

In the display apparatus 10 according to the eighth embodiment, it is possible to seal the gap between the lateral side of the liquid crystal display panel 1320 and the guide sidewall 202 through the sealing member 1500, thereby preventing the foreign matters such as dust from coming into the inside of the display apparatus through the gap. This provides the same effects as those of the seventh embodiment of the present invention.

Figure 22:
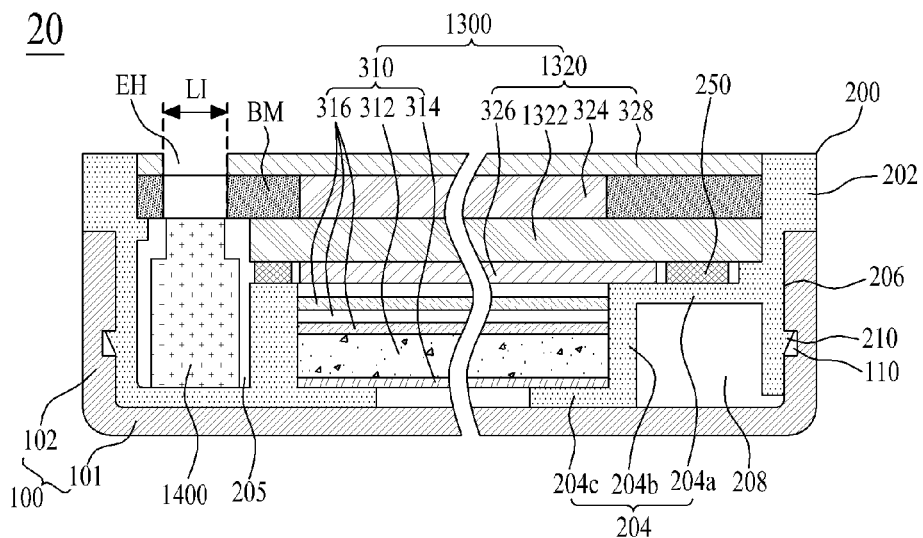
FIG. 22 is a cross section view illustrating a display apparatus according to a ninth embodiment of the present invention.

FIG. 22 is a cross section view schematically illustrating a display apparatus according to a ninth embodiment of the present invention. Referring to FIG. 22, the display apparatus 20 according to the ninth embodiment includes a set cover 100, a guide frame 200, a display unit 1300, a camera 1400, and an exposure hole (EH). Except for the additional exposure hole (EH), the display apparatus 20 according to the ninth embodiment is identical in structure to the display apparatus according to the seventh embodiment shown in FIGS. 14 to 17, whereby a detailed explanation for the same parts will be omitted, and the same reference numbers will be used throughout the drawings to refer to the same or like parts.

The exposure hole (EH) may be formed in a predetermined portion of an upper polarizing plate 328 corresponding to a light-incidence portion (L1) overlapping with a camera-receiving portion 205. Thus, the camera 1400 takes a series of photographs of the surroundings through the use of ambient light incident on the light-incidence portion (L1) through the exposure hole (EH) in the upper polarizing plate 328.

The display apparatus 20 according to the ninth embodiment of the present invention may further comprise a sealing member (not shown) along a front edge of the display unit 1300 so as to seal a gap (not shown) between a lateral side of a liquid crystal display panel 1320 and a guide frame 200.

The sealing member may be formed in any one among the sealing members 1500 shown in FIGS. 18 to 21, whereby a detailed explanation for the sealing member will be substituted by the aforementioned descriptions of FIGS. 18 to 21.

The display apparatus 20 according to the ninth embodiment includes the exposure hole (EH) that is formed in the upper polarizing plate 328 while being overlapping with the light-incidence portion (L1) corresponding to the camera 1400, thereby improving picture quality of the photographs taken by the camera 1400. This provides the same effects as those of the seventh and eighth embodiments of the present invention.

Figure 23:
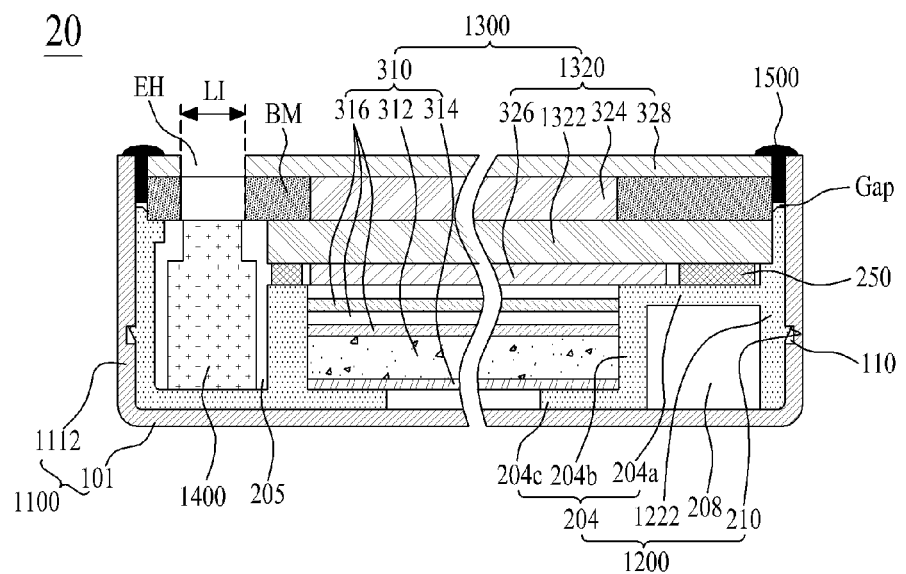
FIG. 23 is a cross section view illustrating a display apparatus according to a tenth embodiment of the present invention.

FIG. 23 is a cross section view illustrating a display apparatus according to a tenth embodiment of the present invention.

Referring to FIG. 23, the display apparatus 20 according to the tenth embodiment includes a set cover 1100, a guide frame 1200, a display unit 1300, and a camera 1400. Except for structures in a set sidewall 1112 of the set cover 1100 and a guide sidewall 1222 of the guide frame 1200, the display apparatus 20 according to the tenth embodiment is identical in structure to the display device according to the ninth embodiment shown in FIG. 22, whereby a detailed explanation for the same parts will be omitted, and the same reference numbers will be used throughout the drawings to refer to the same or like parts.

The set cover 1100 may be formed in a rectangular-shaped frame to include a set plate 101 and set sidewall 1112. The set cover 1100 supports the guide frame 1200 and display unit 1300, and simultaneously covers a lateral side of the display unit 1300, to thereby function as a cover for covering lateral and rear sides of the manufactured display apparatus. The set plate 101 may be formed in a flat type to function as a rear cover of the manufactured display device. The set sidewall 1112 may be vertically curved from the set plate 101, to thereby form a storage space. In this case, an upper end of the set sidewall 1112 covers a lateral side of the display unit 1300. Simultaneously, the upper end of the set sidewall 1112 is exposed to the external without overlapping with an upper edge of the display unit 1300, thereby forming an edge of the display unit 1300.

The guide frame 1200 may be received in the storage space of the set cover 1100 to support the display unit 1300 and receive the camera 1400 therein. For this, the guide frame 1200 includes the guide sidewall 1222, a supporter 204, a camera-receiving portion 205, and a plurality of first coupling members 210. Except for the guide sidewall 1222 of the guide frame 200, the guide frame 200 may be formed in a structure of any one among the aforementioned seventh to ninth embodiments of the present invention, whereby a detailed explanation for the guide frame 200 will be omitted.

The guide sidewall 1222 may be vertically formed to cover a lower surface of the liquid crystal display panel 1320 while being parallel to the set sidewall 102, to thereby guide the liquid crystal display panel 1320 in its placing. In a lower outer surface of the guide sidewall 1222, a plurality of first coupling members 210 are connected to the set sidewall 1112. Also, stepped surfaces are formed in an upper portion of the guide sidewall 222 protruding from the supporter 204, whereby the liquid crystal display panel 1320 is placed onto the supporter 204 by the stepped surfaces. In an inner surface of the set sidewall 1112, a plurality of second coupling members 110 are formed to be coupled to the plurality of first coupling members 210, respectively. Each of the second coupling members 110 is formed in a groove shape to be coupled to the stepped surface of each of the first coupling members 210, thereby preventing a separation of the guide frame 1200. Also, the set cover 1100 and the guide frame 1200 are connected to each other.

The display apparatus 20 according to the tenth embodiment may further include a sealing member 1500 along a front edge of the display unit 1300 to seal a gap between the lateral side of the liquid crystal display panel 1320 and the set sidewall 1112. The sealing member 1500 may be formed in a pin shape including a head for covering the gap, and a head supporter inserted into the gap to support the head. Instead of the pin shape, the sealing member 1500 may be formed in a ring shape or film shape shown in FIG. 18 or 20.

In the display apparatus 20 according to the tenth embodiment, the set cover 1100 covers the lateral and rear sides of the display apparatus, and also forms the front edge of the display unit 1300, thereby minimizing the edge width and providing the same effects as those of the aforementioned embodiment.

Figure 24:
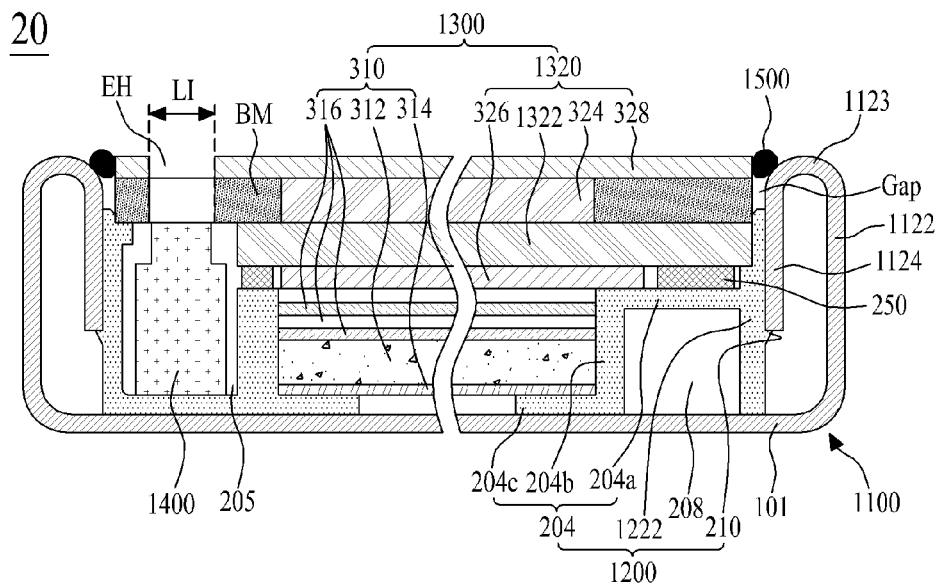
FIG. 24 is a cross section view illustrating a display apparatus according to an eleventh embodiment of the present invention.

FIG. 24 is a cross section view illustrating a display apparatus according to an eleventh embodiment of the present invention. Referring to FIG. 24, the display apparatus 20 according to the eleventh embodiment includes a set cover 100, a guide frame 200, a display unit 1300, and a camera 1400. Except for a set cover 1100, the display apparatus 20 according to the eleventh embodiment is identical in structure to the display apparatus according to the tenth embodiment, whereby a detailed explanation for the same parts will be omitted.

The set cover 1100 supports the guide frame 1200 and covers a lateral side of the display unit 1300, to thereby function as a cover for covering lateral and rear sides of the manufactured display apparatus. For this, the set cover 1100 comprises a set plate 101, a set sidewall 122, a bending part 1123, and an inner sidewall 1124.

The set plate 101 supports the guide frame 1200 onto which the display unit 1300 is placed. The set sidewall 1122 may be vertically bent from the set plate 101, to thereby provide a storage space for receiving the guide frame 1200 therein. The bending part 1123 with a predetermined curvature may be bent from one end of the set sidewall 1122 toward the display unit 1300. The bending part 1123 covering the lateral side of the display unit 1300 is exposed to the external without overlapping with an upper edge of the display unit 1300, thereby forming an edge of the display unit 1300. The inner sidewall 1124 may be vertically extended from one end of the bending part 1123 while being parallel to the set sidewall 1122, and is then connected to a first coupling member 210 in a guide sidewall 1222 of the guide frame 1200.

The display apparatus 20 according to the eleventh embodiment may further include a sealing member 1500 along a front edge of the display unit 1300 to seal a gap between the lateral side of the liquid crystal display panel 1320 and the bending part 1123. The sealing member 1500 may be formed in a pin shape including a head for covering the gap, and a head supporter inserted into the gap so as to support the head. Instead of the pin shape, the sealing member 1500 may be formed in a ring shape or film shape shown in FIG. 18 or 20.

In the display apparatus 20 according to the eleventh embodiment, the bending part 1123 of the set cover 1100 and the guide frame 1200 are connected to each other, and the bending part 1123 forms the front edge of the display unit 1300, thereby realizing a good aesthetic exterior appearance through the use of bending part 1123 and providing the same effects as those of the aforementioned embodiments of the present invention.

Figure 25:
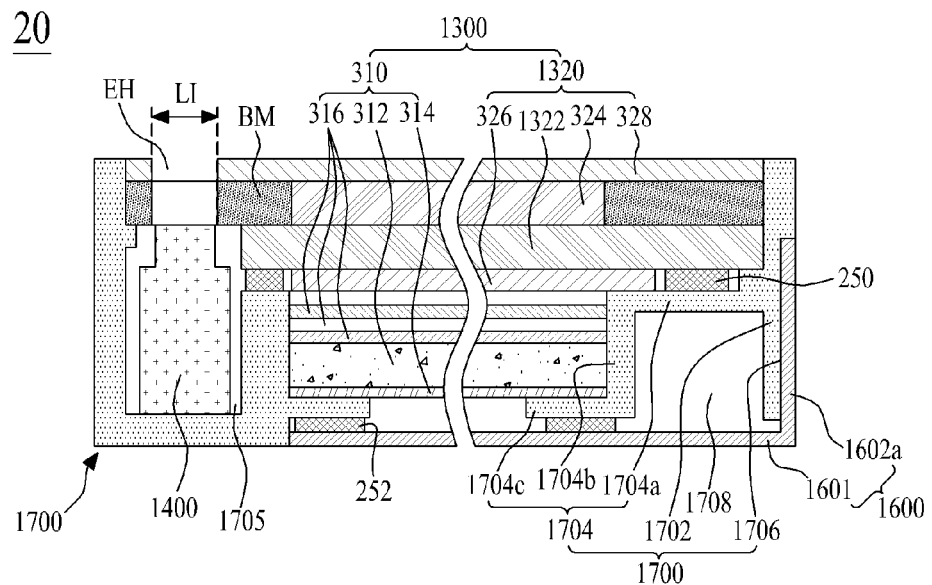
FIG. 25 is a cross section view illustrating a display apparatus according to a twelfth embodiment of the present invention.
Figure 26:
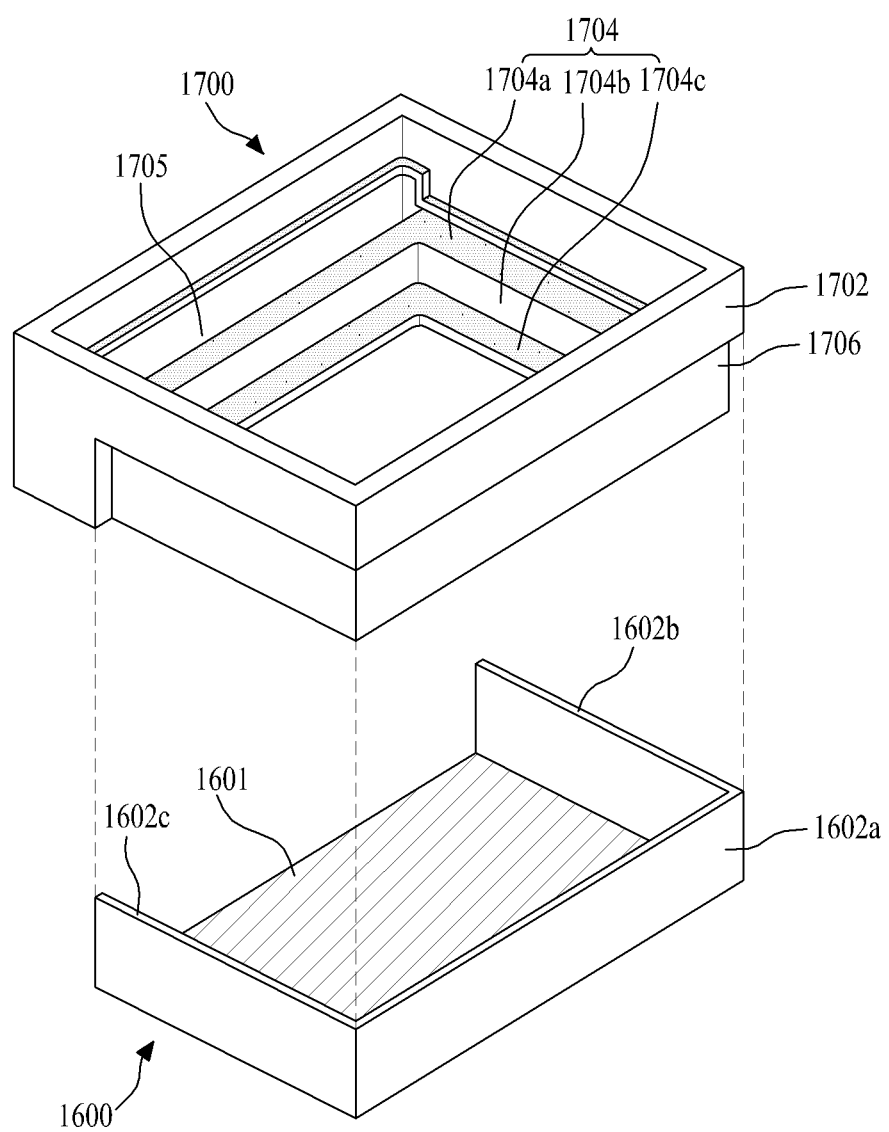
FIG. 26 is a perspective view illustrating a set cover and a guide frame shown in FIG. 25.

FIG. 25 is a cross section view schematically illustrating a display apparatus according to a twelfth embodiment of the present invention. FIG. 26 is a perspective view schematically illustrating a set cover and a guide frame shown in FIG. 25.

Referring to FIGS. 25 and 26, the display apparatus 20 according to the twelfth embodiment includes a set cover 1600, a guide frame 1700, a display unit 1300, and a camera 1400. Except for the set cover 1600 and guide frame 1700, the display apparatus 20 according to the twelfth embodiment is identical in structure to the display apparatus according to the ninth embodiment shown in FIG. 22, whereby a detailed explanation for the same parts will be omitted.

The set cover 1600 supports the guide frame 1700 and covers a lateral side of the guide frame 1700, to thereby function as a cover of the manufactured display apparatus. For this, the set cover 1600 comprises a set plate 1601, and first to third set sidewalls 1602*a*, 1602*b*, and 1602*c*.

The set plate 1601 supports the guide frame 1700 onto which the display unit 1300 is placed. The first set sidewall 1602*a* may be vertically curved from a lower surface of the set plate 1601, to thereby cover partial portions of a lower surface of the guide frame 1700. The second set sidewall 1602*b* may be vertically curved from a left-sided surface of the set plate 1601, to thereby cover a left-sided lower surface of the guide frame 1700. The third set sidewall 1602*c* may be vertically curved from a right-sided surface of the set plate 1601, to thereby cover a right-sided lower surface of the guide frame 1700. The first to third set sidewalls 1602*a*, 1602*b*, and 1602*c* form a storage space for receiving the guide frame 1700 therein.

The guide frame 1700 is received in the storage space prepared by the set cover 1600. Thus, the display unit 1300 is supported by the guide frame 1700, and the camera 1400 is received in the guide frame 1700. For this, the guide frame 1700 comprises a guide sidewall 1702, a supporter 1704, a camera-receiving portion 1705, and a set sidewall insertion groove 1706.

The guide sidewall 1702 may be vertically formed to cover a lateral side of the display unit 1300. At this time, an upper surface of the guide sidewall 1702 covering the lateral side of the display unit 1300 is exposed to the external without overlapping with an upper edge of the display unit 1300, thereby forming an edge of the display unit 1300. The supporter 1704 protrudes from the guide sidewall 1702, to thereby support the display unit 1300. For this, the supporter 1704 comprises a first part 1704a, a curved part 1704b, and a second part 1704c.

While being parallel to the set plate 1601, the first part 1704a protrudes from other portions of the guide sidewall 1702 except for a predetermined portion to be adjacent to the camera-receiving portion 1705. At this time, the first part 1704a protrudes with a predetermined width from the guide sidewall 1702 corresponding to the first to third set sidewalls 1602a, 1602b, and 1602c, and simultaneously protrudes to connect the guide sidewalls 1702 corresponding to the second and third set sidewalls 1602b and 1602c to each other. The curved part 1704b may be vertically curved from one end of the first part 704a toward the set plate 601. The second part 1704c may be curved from one end of the curved part 1704b while being parallel to the set plate 1601 and being placed onto the set plate 1601. The camera-receiving portion 1705 may be formed in a space between the first part 1704a of the supporter 1704 and the guide sidewalls 1702 covering one lateral side of the display unit 1300 (for example, an upper portion of the display unit). That is, the camera-receiving portion 1705 may be hollowly formed in the first part 1704a and the guide sidewall 1702 that is not covered by the set cover 1600. Thus, each lateral side and a rear side of one edge of the guide frame 1700 with the camera-receiving portion 1705 may be exposed to the external without being covered by the set cover 1600. Moreover, the camera 1400, a driving circuit (not shown) for driving and controlling the camera 1400, a notebook system controller (not shown), or a signal line for connecting the driving circuit and a controller (not shown) of the display unit may be received in the camera-receiving portion 1705.

The set sidewall insertion groove 1706 may be hollowly formed in the lower outer surface of the guide sidewall 1702 except for the upper outer surface of the guide sidewall 1702 corresponding to the first to third set sidewalls 1602a, 1602b, and 1602c. The set sidewall insertion groove 1706 may be covered by the first to third set sidewalls 1602a, 1602b, and 1602c. The guide frame 1700 may further include an empty room 1708 between the guide sidewall 1702 and the curved part 1704b of the supporter 1704. An antenna or antenna wire used for a notebook computer may be arranged in the empty room 1708.

The aforementioned guide frame 1700 may be connected to the set plate 1601 by an adhesive member 252. At this time, the adhesive member 252 may be a double-sided tape. The adhesive member 252 adheres onto the rear side of the second part 1704c formed in the supporter 1704 of the guide frame 1700, whereby the guide frame 1700 is placed onto the set plate 1601. Thus, the guide frame 1700 may be received in and connected to the set cover 1600 by the adhesive member 252 without using an additional coupling member.

The display apparatus 20 according to the twelfth embodiment may further include a sealing member (not shown) along a front edge of the display unit 1300 to seal a gap (not shown) between the lateral side of the liquid crystal display panel 1320 and the guide sidewall 1702. The sealing member may be formed in any one of ring shape, pin shape, and film shape shown in FIGS. 18 to 21.

In the display apparatus 20 according to the twelfth embodiment, the set cover 1100 covers the rear side and three lateral sides of the guide frame 1700, and the adhesive member 252 connects the guide frame 1700 and the set cover 1600 to each other, whereby the guide sidewall 1702 of the guide frame 1700 forms the front edge of the display unit 1300. This provides the same effects as those of the aforementioned embodiments of the present invention.

Figure 27:
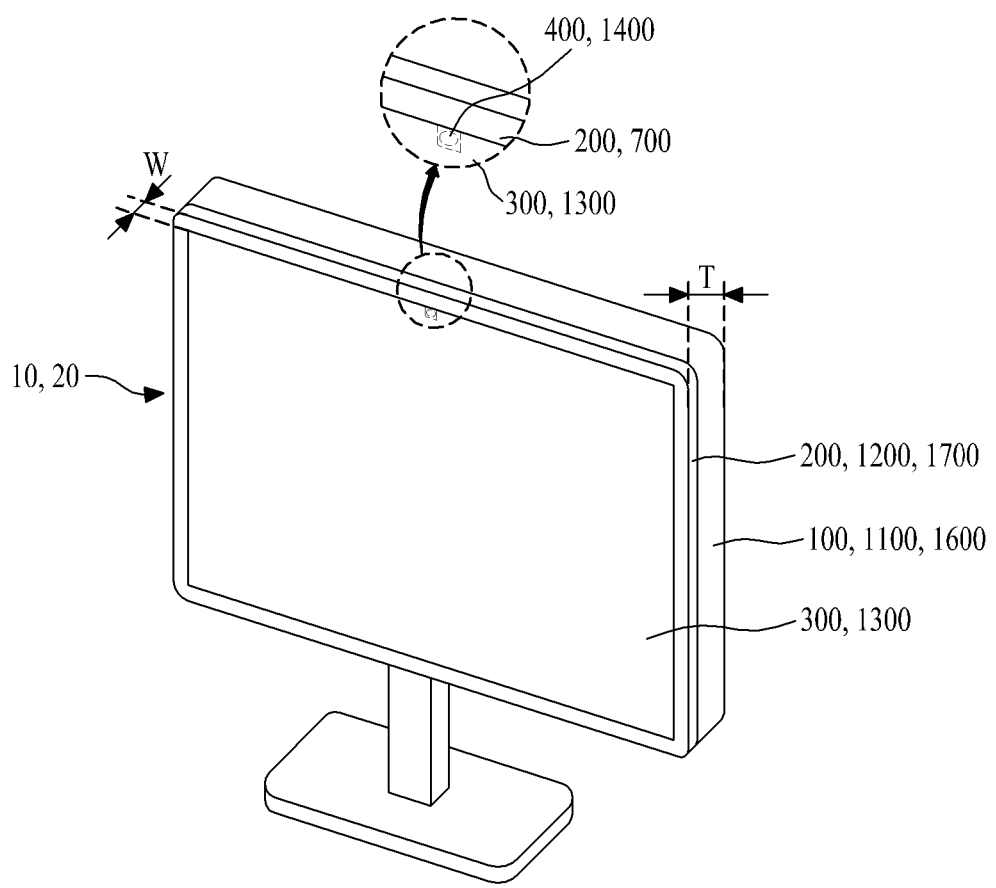
FIG. 27 illustrates a camera-embedded display apparatus used for a monitor or television according to an exemplary embodiment of the present invention.

For the above explanation, the display apparatus 10 or 20 of the aforementioned embodiments of the present invention may be used for, but not limited to, a notebook computer. That is, the display apparatus 10 or 20 of the aforementioned embodiments of the present invention may be readily used for a camera-embedded monitor or television, and mobile device as shown in FIG. 27.

It will be apparent to those skilled in the art that various modifications and variations can be made in the display apparatus of the present invention without departing from the spirit or scope of the inventions. Thus, it is intended that the present invention covers the modifications and variations of this invention provided they come within the scope of the appended claims and their equivalents.

What is claimed is:

1. A display apparatus comprising:
   a set cover exposed to have a storage space;
   a guide frame received in the storage space;
   a display unit placed onto the guide frame, the display unit including a display panel that is formed by bonding lower and upper substrates to each other; and
   a camera overlapping with one edge of the display unit and received in the guide frame,
   wherein the guide frame comprises:
   a guide sidewall for covering a lateral side of the display unit;
   a supporter comprising a first part which is formed to be protruded from the guide sidewall for supporting rear side of the display unit, a curved part which is formed to be curved from the first part, and a second part which is formed to support the curved part and the camera, and placed onto the set cover, and
   a camera-receiving portion for receiving the camera therein, the camera-receiving portion being formed in space between the first part and the guide sidewall corresponding to the one edge of the display unit.

2. The display apparatus according to claim 1, further comprising an adhesive member for placing the display panel onto the first part.

3. The display apparatus according to claim 2, wherein the camera is received in the camera-receiving portion corresponding to a light-incidence portion prepared above one edge of the display unit, so that the camera takes a series of photographs through the light-incidence portion.

4. The display apparatus according to claim 3, wherein the display panel comprises:
   the lower substrate including a light-emitting device, the lower substrate overlapping with the camera and placed onto the first part; and
   the upper substrate bonded to the lower substrate,
   wherein the upper substrate comprises a black matrix that is formed in other edge portions except for a predetermined portion overlapping with the light-incidence portion.

5. The display apparatus according to claim 2, wherein the camera is received in the camera-receiving portion to correspond to the light-incidence portion prepared at one edge of the upper substrate without overlapping with the lower substrate, so that the camera takes a series of photographs through the light-incidence portion.

6. The display apparatus according to claim 5, wherein the display unit further comprises a backlight unit for emitting light to the display panel, wherein the backlight unit is placed onto the second part and provided to correspond to a lower portion of the display panel.

7. The display apparatus according to claim 6, wherein the display panel comprises:
   the lower substrate placed onto the first part without overlapping with the camera;
   a lower polarizing plate adhering to a rear surface of the lower substrate, the lower polarizing plate facing the backlight unit;
   the upper substrate bonded to the lower substrate with a liquid crystal layer interposed therebetween; and
   an upper polarizing plate adhering onto an entire surface of the upper substrate,
   wherein the upper substrate includes a black matrix that is formed in other edge portions except for a predetermined portion overlapping with the light-incidence portion.

8. The display apparatus according to claim 7, wherein the upper polarizing plate includes an exposure hole that overlaps with the light-incidence portion.

9. The display apparatus according to claim 5, wherein the display panel comprises:
   the lower substrate including a light-emitting device, the lower substrate placed onto the first part without overlapping with the camera; and
   the upper substrate bonded to the lower substrate,
   wherein the upper substrate comprises a black matrix that is formed in other edge portions except for a predetermined portion overlapping with the light-incidence portion.

10. The display apparatus according to claim 1, wherein the display unit further comprises a backlight unit for emitting light to the display panel, wherein the backlight unit is placed onto the second part and provided to be corresponding to a lower portion of the display panel.

11. The display apparatus according to claim 10, wherein the display panel comprises:
    the lower substrate placed onto the first part;
    a lower polarizing plate adhering to a rear surface of the lower substrate, the lower polarizing plate facing the backlight unit;
    the upper substrate bonded to the lower substrate with a liquid crystal layer interposed therebetween; and
    an upper polarizing plate adhering onto an entire surface of the upper substrate,
    wherein the upper substrate includes a black matrix that is formed in other edge portions except for a predetermined portion overlapping with the light-incidence portion.

12. The display apparatus according to claim 11, wherein the upper polarizing plate includes an exposure hole that overlaps with the light-incidence portion.

13. The display apparatus according to claim 1, wherein the set cover comprises:
    a set plate onto which the guide frame is placed; and
    a set sidewall curved from the set plate to form the storage space, the set sidewall for covering the lateral side of the display unit,
    wherein an upper end of the set sidewall is exposed to cover the lateral side of the display unit, and the upper end of the set sidewall forms an edge of the display unit.

14. The display apparatus according to claim 1, wherein the guide frame further comprises:
    a set sidewall insertion groove hollowly formed in a lower outer surface of the guide sidewall except for an upper outer surface of the guide sidewall; and
    a first coupling member formed in the set sidewall insertion groove and connected to the set cover,
    wherein an upper surface of the guide sidewall is exposed to cover a lateral side of the display unit, and the upper surface of the guide sidewall forms an edge of the display unit.

15. The display apparatus according to claim 14, wherein the set cover comprises:
    a set plate onto which the guide frame is placed;
    a set sidewall curved from the set plate to form the storage space, and inserted into the set sidewall insertion groove; and
    a second coupling member formed in the set sidewall and coupled to the first coupling member.

16. The display apparatus according to claim 1, wherein the guide frame further comprises a coupling member formed in the guide sidewall.

17. The display apparatus according to claim 16, wherein the set cover comprises:
    a set plate for forming the storage space, and a set sidewall curved from the set plate;
    a bending part bent from one end of the set sidewall toward the lateral side of the display unit to have a predetermined curvature; and
    an inner sidewall vertically extended from an end of the bending part in parallel to the set sidewall, and connected to the coupling member,
    wherein the bending part is exposed to cover a lateral side of the display unit, and the bending part forms an edge of the display unit.

18. The display apparatus according to claim 1, wherein the rear surface of the supporter and the guide sidewall for preparing the camera-receiving portion are exposed to an external of the display apparatus.

19. The display apparatus according to claim 18, wherein the set cover comprises:
    a set plate for supporting the rear surfaces of other guide frames except for the rear surface of the guide frame corresponding to the camera-receiving portion; and
    first to third set sidewalls curved from the set plate to cover the other portions of the guide sidewall except for predetermined portions of the guide sidewall for preparing the camera-receiving portion, and to form the storage space.

20. The display apparatus according to claim 19, wherein the guide frame further comprises a set sidewall insertion groove formed in the guide sidewall and provided with the first to third set sidewalls to be inserted thereinto,
    wherein an upper surface of the guide sidewall is exposed to cover the lateral side of the display unit, and the upper surface of the guide sidewall forms an edge of the display unit.

21. The display apparatus according to claim 19, wherein the guide frame is connected to the set plate by an adhesive member.

22. The display apparatus according to claim 1, further comprising a sealing member formed along a front edge of the display unit to seal a gap between the lateral side of the display unit and the set cover or a gap between the lateral side of the display unit and the guide sidewall.

23. The display apparatus according to claim 22, wherein the sealing member is formed in any one shape among a ring shape, a pin shape having a head, and a film shape.

\* \* \* \* \*